US011924174B2

(12) United States Patent
McCarty et al.

(10) Patent No.: US 11,924,174 B2
(45) Date of Patent: *Mar. 5, 2024

(54) SECRET SUPERPOSITION PROTOCOLS FOR QUANTUM COMPUTATION

(71) Applicant: Accenture Global Solutions Limited, Dublin (IE)

(72) Inventors: Benjamin Glen McCarty, Washington, DC (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,179

(22) Filed: Sep. 23, 2022

(65) Prior Publication Data

US 2023/0067766 A1 Mar. 2, 2023

Related U.S. Application Data

(63) Continuation of application No. 17/458,080, filed on Aug. 26, 2021, now Pat. No. 11,516,190.

(51) Int. Cl.
*H04L 9/40* (2022.01)
*G06N 10/00* (2022.01)

(52) U.S. Cl.
CPC ......... *H04L 63/0428* (2013.01); *G06N 10/00* (2019.01)

(58) Field of Classification Search
CPC .... H04L 63/0428; H04L 9/0858; G06N 10/00
USPC ........................................... 713/150
See application file for complete search history.

(56) References Cited

U.S. PATENT DOCUMENTS

| 7,035,411 | B2* | 4/2006 | Azuma | H04L 9/0852 380/263 |
| 9,306,739 | B1* | 4/2016 | Troupe | H04L 9/0858 |
| 9,858,531 | B1* | 1/2018 | Monroe | G06F 15/76 |
| 11,516,190 | B1 | 11/2022 | McCarty et al. | |
| 2016/0028542 | A1 | 1/2016 | Choi et al. | |
| 2019/0080254 | A1 | 3/2019 | Haah et al. | |
| 2020/0153619 | A1* | 5/2020 | Ribordy | H04L 9/0852 |

(Continued)

OTHER PUBLICATIONS

Extended Search Report in European Appln. No. 22190366.9, dated Jan. 23, 2023, 7 pages.

(Continued)

*Primary Examiner* — Amare F Tabor
(74) *Attorney, Agent, or Firm* — Fish & Richardson P.C.

(57) ABSTRACT

Methods, systems and apparatus, including computer programs encoded on computer storage medium, for implementation of secret superposition protocols. In one aspect a method includes, performing, by a sender party, quantum operations on one or more qubits, comprising preparing, according to a predetermined secret superposition protocol, one or more qubits in respective uniform superposition quantum states; transmitting, by the sender party, to a recipient party, and through a secure channel, data indicating use of the predetermined secret superposition protocol; and transmitting, by the sender party and to the recipient party, one or more of the qubits, to wherein the recipient party performs one or more measurements on the qubits to verify use of the predetermined secret superposition protocol.

17 Claims, 23 Drawing Sheets

(56) References Cited

U.S. PATENT DOCUMENTS

| | | | |
|---|---|---|---|
| 2021/0058244 A1* | 2/2021 | Jacak | H04L 9/0852 |
| 2021/0105130 A1* | 4/2021 | Griffin | H04L 9/0852 |
| 2022/0083488 A1* | 3/2022 | Black | H04L 9/0855 |

OTHER PUBLICATIONS

Warke et al., "Experimental realization of three quantum key distribution protocols," Quantum Information Processing, Nov. 9, 2020, 19:407, 15 pages.

* cited by examiner

US 11,924,174 B2

SECRET SUPERPOSITION PROTOCOLS FOR QUANTUM COMPUTATION

CROSS-REFERENCE TO RELATED APPLICATION

This application is a continuation of U.S. application Ser. No. 17/458,080, filed Aug. 26, 2021, which is incorporated by reference.

TECHNICAL FIELD

This specification relates to the fields of cryptography, computer security, and quantum computing.

BACKGROUND

In cryptography and computer security, a man-in-the-middle attack (MITM) is an attack where an attacker secretly relays or alters communications between a sender party and recipient party who believe that they are directly communicating with each other. One example MITM attack is active eavesdropping. During active eavesdropping, an attacker makes independent connections with the sender party and recipient party and relays messages between them to make them believe they are talking directly to each other over a private connection. For MITM attacks to be successful, the attacker must be able to successfully intercept all relevant messages passing between the two parties and inject new ones.

SUMMARY

This specification describes systems, methods, devices, and other techniques for implementing secret superposition protocols for quantum computation.

In general, one innovative aspect of the subject matter described in this specification can be implemented in a method that includes performing, by a sender party, quantum operations on one or more qubits, comprising preparing, according to a predetermined secret superposition protocol, one or more qubits in respective uniform superposition quantum states; transmitting, by the sender party, to a recipient party, and through a secure channel, data indicating use of the 3o predetermined secret superposition protocol; and transmitting, by the sender party and to the recipient party, one or more of the qubits, wherein the recipient party performs one or more measurements on the qubits to verify use of the predetermined secret superposition protocol.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations preparing one or more qubits in respective uniform superposition quantum states comprises, for each qubit, applying a respective superposition quantum gate to the qubit.

In some implementations the superposition quantum gate implements a 180 degree rotation around a respective diagonal axis of the Bloch sphere.

In some implementations the superposition quantum gate provides an operational functionality equal to the operational functionality of the Hadamard gate.

In some implementations applying a superposition quantum gate to a qubit comprises applying a superposition quantum gate to a qubit initialized in an 0-state.

In some implementations a first superposition quantum gate implements a 180 degree rotation around the Y+Z axis of the Bloch sphere.

In some implementations applying the first superposition quantum gate to the qubit comprises applying a Aix Pauli gate, IY Pauli gate and a Hadamard gate to the qubit.

In some implementations a second superposition quantum gate implements a 180 degree rotation around the Y-Z axis of the Bloch sphere.

In some implementations applying the second superposition quantum gate to the qubit comprises applying a IY Pauli gate, a Hadamard gate, and a Aix Pauli gate to the qubit.

In some implementations a third superposition quantum gate implements a 180 degree rotation around the X-Z axis of the Bloch sphere.

In some implementations applying the third superposition quantum gate to the qubit comprises applying a Y Pauli gate and a Hadamard gate to the qubit.

In some implementations the superposition quantum gate comprises a Hadamard gate.

In some implementations performing quantum operations on the one or more qubits further comprises generating one or more entangled quantum states using the uniform superposition quantum states.

In some implementations generating a maximally entangled quantum state comprises one or more of: applying a CNOT gate to i) a uniform superposition quantum state and ii) a qubit prepared in a 0-state, wherein the uniform superposition quantum state acts as a control for the CNOT gate, or applying a controlled Pauli Y gate to i) a uniform superposition quantum state and ii) a qubit prepared in a 0-state, wherein the uniform superposition quantum state acts as a control for the controlled Pauli Y gate.

In some implementations the quantum operations comprise a quantum symmetry breaking algorithm, quantum super dense coding, quantum teleportation, or a quantum distributed key algorithm.

In some implementations the sender party and the recipient party comprise parties authorized to perform quantum gate operations under one or more secret superposition protocols.

In some implementations the method further comprises adding superposition quantum gates corresponding to each secret superposition protocol to libraries of logic gate operations included in quantum computers used by the authorized parties.

In general, another innovative aspect of the subject matter described in this specification can be implemented in a method that includes receiving, by a recipient party, from a sender party and through a secure channel, data indicating use of a predetermined secret superposition protocol used by the sender party to prepare one or more qubits in respective uniform superposition quantum states; receiving, by the recipient party and from the sender party, one or more qubits; performing, by the recipient party and using the secret superposition protocol, one or more quantum operations on the one or more qubits, the quantum gate operations comprising measurement operations; and evaluating, by the recipient party, measurement outcomes of the measurement operations to verify use of the secret superposition protocol.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular ways so as to realize one or more of the following advantages.

A sender party implementing the presently described techniques can transmit qubits encoding quantum information to a recipient party with reduced risk that an eavesdropper intercepts the qubits and learns the quantum information encoded in the qubits and/or makes qubit measurement outcomes predictable. The quantum information can remain confidential, its integrity protected. Accordingly, the confidentiality and integrity of quantum protocols, quantum algorithms or quantum systems used to share secrets and information between different parties is improved.

In addition, the presently described secret superposition protocols can be used to improve secrecy and mitigate tampering or attacks in a wide variety of applications including quantum symmetry breaking algorithms, e.g., quantum random number generation, quantum superdense coding, quantum teleportation and quantum distributed key/secret algorithms.

In addition, the presently described secret superposition protocols include quantum computing operations that can be chosen to be universal, elementary, e.g., including only single or two-qubit gates, and/or in the Clifford-group. Expensive operations, e.g., implementations of T gates are not required. In addition, the presently described secret superposition protocols use the standard superposition basis $\{+, -.i, -i\}$, which can be initialized as part of state preparation outside of the protocol. Implementations of the quantum computations required to implement the secret superposition protocols can therefore be computationally stable, efficient and quantum hardware agnostic.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The Hadamard gate H is used as a default standard to prepare qubits in a superposition state and/or an entangled state, with the |+> basis state often preferred. Accordingly, adversaries attempting to tamper with, reverse engineer, intercept or attack quantum algorithms, quantum protocols, quantum memories or quantum communications which use superposition or entanglement can safely assume that the qubits were initialized in a |0> state and transformed to a plus state |+> using a Hadamard gate.

Priori knowledge of default standards allows threat actors to reverse or break quantum algorithms because quantum logic gates are reversible. This can change qubit probability amplitudes to the adversaries' benefit, e.g., by making qubit measurement outcomes predictable. This can threaten the confidentiality and integrity of quantum protocols, algorithms or systems to share secrets or information securely between different parties.

This specification describes secret superposition protocols that implement various secret superposition states or entangled states using secret superposition quantum gates. The secret superposition quantum gates are Hadamard-like transforms in different rotational axis, that is they can work as a secret whilst retaining operational functionality of a Hadamard gate. Accordingly, qubits can be initialized to basis states other than |+> which an adversary cannot safely assume to know or guess.

Figure 1:
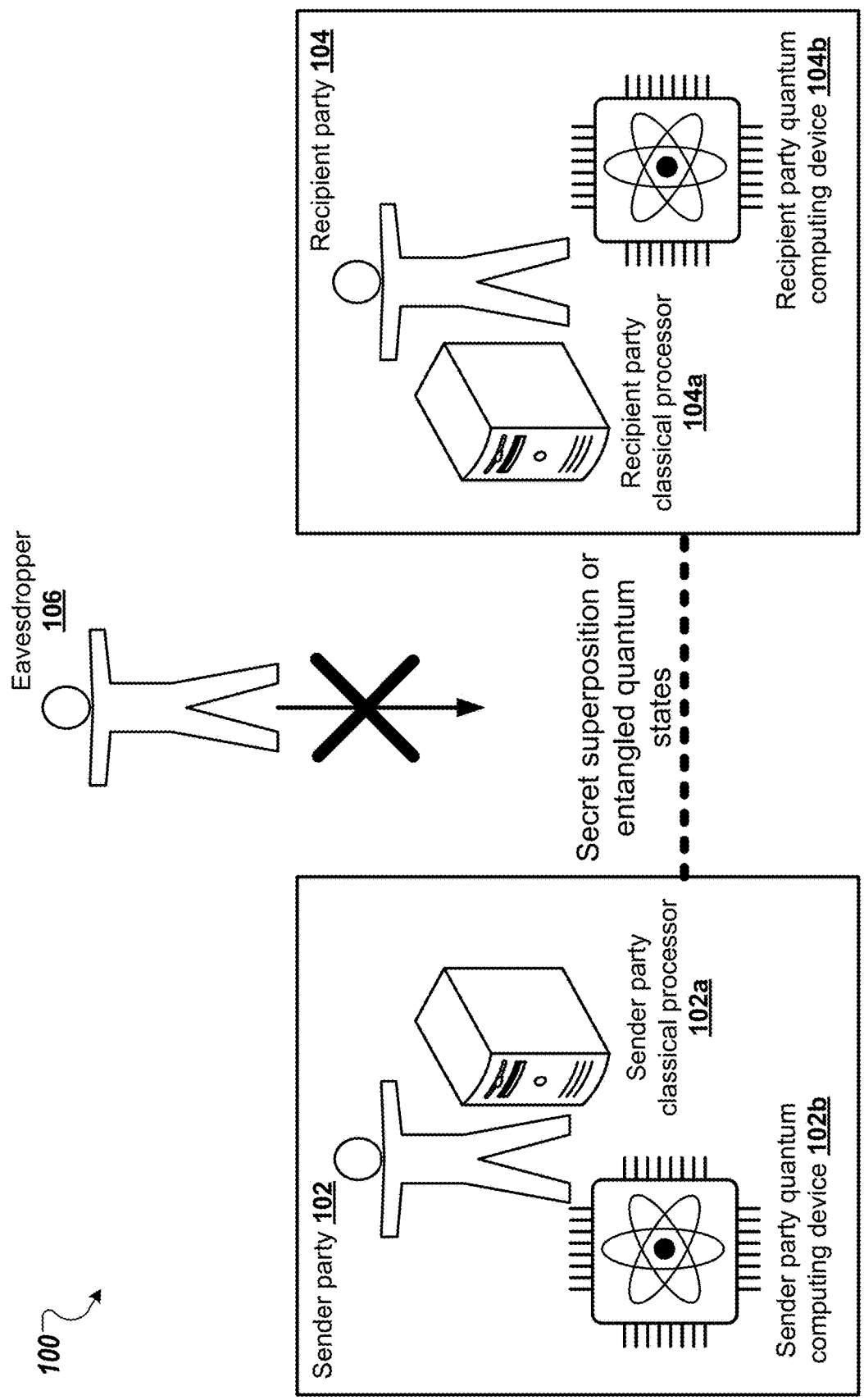
FIG. 1 shows a conceptual block diagram of an example system for sending secret superposition states or entangled states that encode quantum information.

FIG. 1 shows a conceptual block diagram 100 of an example system for sending secret superposition states or entangled states that encode quantum information. The example system 100 includes a sender party 102 and a recipient party 104. The sender party 102 includes a sender party classical processor 102a and a sender party quantum computing device 102b. The sender party classical processor 102a and sender party quantum computing device 102b can 3o exchange electronic communications over one or more networks, or can exchange communications in another way, such as over one or more wired or wireless connections.

The sender party classical processor 102a is configured to perform classical computations. The sender party quantum computing device 102b is configured to perform quantum computations. For convenience, the sender party classical processor 102a and sender party quantum computing device 102b are illustrated as separate entities. However, in some implementations the classical processor 102a can be included in the quantum computing device 102b. That is, the quantum computing device 102b can include components for performing classical computing operations. Generally, the classical computing components of the sender party 102 can be implemented as one or more classical computers having physical hardware like that described with respect to FIG. 12 and the quantum computing components of the sender party 102 can be implemented as quantum computing devices having physical hardware like that described with respect to FIG. 11.

The recipient party 104 includes a recipient party classical processor 104a and a recipient party quantum computing device 104b. The recipient party classical processor 104a and recipient party quantum computing device 104b can exchange electronic communications over one or more networks, or can exchange communications in another way, such as over one or more wired or wireless connections.

The recipient party classical processor 104a is configured to perform classical computations. The recipient party quantum computing device 104b is configured to perform quantum computations. For convenience, the recipient party classical processor 104a and recipient party quantum computing device 104b are illustrated as separate entities. However, in some implementations the classical processor 104a can be included in the quantum computing device 104b. That is, the quantum computing device 104b can include components for performing classical computing operations. Generally, the classical computing components of the recipient party 104 can be implemented as one or more classical computers having physical hardware like that described with respect to FIG. 12 and the quantum computing components of the recipient party 104 can be implemented as quantum computing devices having physical hardware like that described with respect to FIG. 11.

The sender party 102 and recipient party 104 use a secret superposition protocol to share quantum information. The sender party 102 is configured to perform quantum operations on one or more qubits, including preparing one or more qubits in secret superposition quantum states or secret entangled states using the secret superposition quantum gates described herein. The sender party 102 is configured to transmit one or more of the qubits to the recipient party 104. Example operations performed by the sender party 102 are described below with reference to FIGS. 2 to 10.

The recipient party 104 is configured to receive data indicating that the sender party 102 is using a particular secret superposition protocol to perform their quantum operations through a secure channel. The recipient party 104 is further configured to receive qubits from the sender party 102. The recipient party 104 is configured to perform quantum operations on the qubits received from the sender party 102 using the secret superposition protocol indicted by the data received from the sender party 102. For example, in response to receiving the data indicating that the sender party 102 is using a particular secret superposition protocol to perform their quantum operations, the recipient party 104 can determine appropriate adjustments to quantum operations to be performed on the qubits based on the secret superposition protocol, e.g., to correctly reverse operations performed by the sender party 102. Example operations performed by the recipient party 104 are described below with reference to FIGS. 2 to 10.

Figure 2:
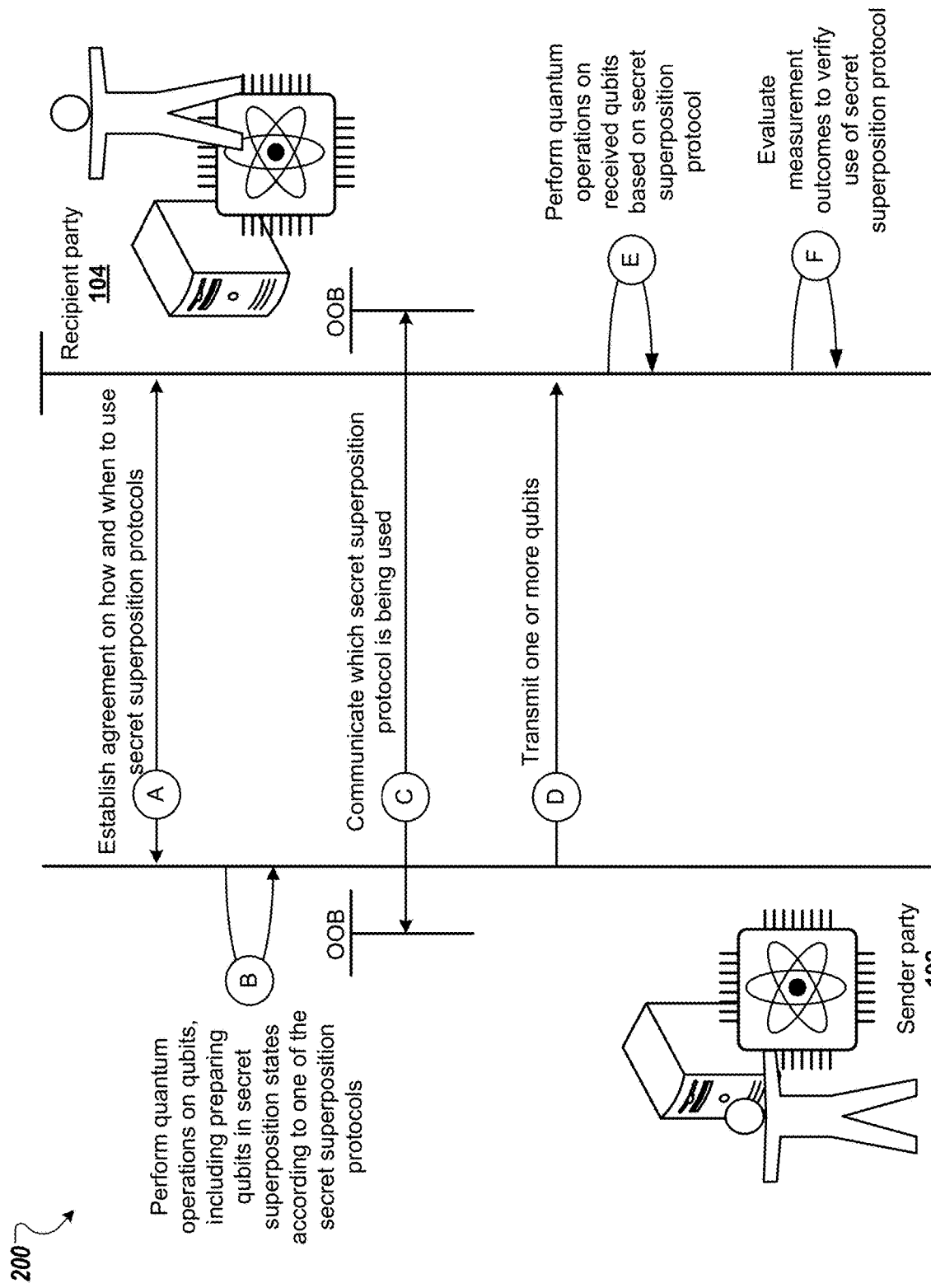
FIG. 2 shows a diagram of an example process for sending secret superposition states or entangled states that encode quantum information.

FIG. 2 shows a conceptual block diagram 200 of an example process for sending secret superposition states or entangled states that encode quantum information from a sender party to a recipient party. For convenience, example process 200 describes sending one packet of secret superposition states or entangled states that encode quantum information, however the example process 200 can be repeated or adjusted to enable multiple packets of qubits to be sent to a recipient party.

During stage (A) of the example process 200, the sender party 102 and the recipient party 104 establish an agreement as to how and when to use one or more secret superposition protocols. Each secret superposition protocol specifies how and when different secret superposition quantum states are to be prepared and how and when different secret entangled quantum states are to be prepared. Example secret superposition quantum states and secret entangled quantum states are described in detail below with reference to FIGS. 3, 4A and 4B. Once the agreement has been established, the sender party 102 and recipient party 104 can add quantum gates and gate sequences used by each secret superposition protocol to its quantum computer in a library of logic gate operations.

During stage (B) of the example process 200, the sender party 102 secretly prepares qubits in superposition states or entangled states according to one of the established one or more secret superposition protocols. Operations performed by the sender party 102 to prepare qubits in superposition states or entangled states according to an established secret superposition protocol are described in more detail below with reference to FIGS. 3, 4A and 4B. During stage (B) of the example process 200, the sender party 102 can also perform other quantum operations on the qubits, e.g., additional operations that are part of a quantum algorithm, protocol, communication or memory.

During stage (C) of the example process 200, the sender party 102 performs a private secure transmission, e.g., out-of-band transmission, to the recipient party 104 to indicate that the sender party 102 is using one of the established secret superposition protocols to prepare qubits in a superposition state or entangled state.

During stage (D) of the example process 200, the sender party 102 transmits qubits to the recipient party 104. The transmitted qubits can include qubits that were prepared in a secret superposition state or secret entangled state according to the secret superposition protocol during stage (B), e.g., half of a secretly entangled pair.

During stage (E) of the example process 200, the recipient party 104 performs appropriate adjustments to an algorithm to be performed on the received qubits (and one or more other qubits included in the recipient party's quantum computer) based on the secret superposition protocol indicated by the transmission at stage (C). The adjustments can include adjusting sequences of gates performed to reverse operations performed to generate a superposition or entangled state, e.g., replacing Hadamard gates with corresponding sequences of single qubit gates or replacing CNOT gates with controlled-Y gates. Example adjustments are described in more detail below with reference to FIGS. 7-10. The recipient party 104 then implements the adjusted algorithm using the received qubits.

During stage (F) of example process 200 the recipient party 104 performs measurements on one or more of their qubits and evaluates the measurement outcomes to determine if the secret entanglement protocol indicated by the transmission at stage (C) was correctly followed or not. For example, the recipient party can compare obtained measurement outcomes to expected measurement outcomes, as described in more detail below with reference to FIGS. 7-10. If the recipient party 104 determines that the secret entanglement protocol was not correctly followed, the recipient party 104 can investigate possible interception or tampering during the transmission at stage (D).

Figure 3:
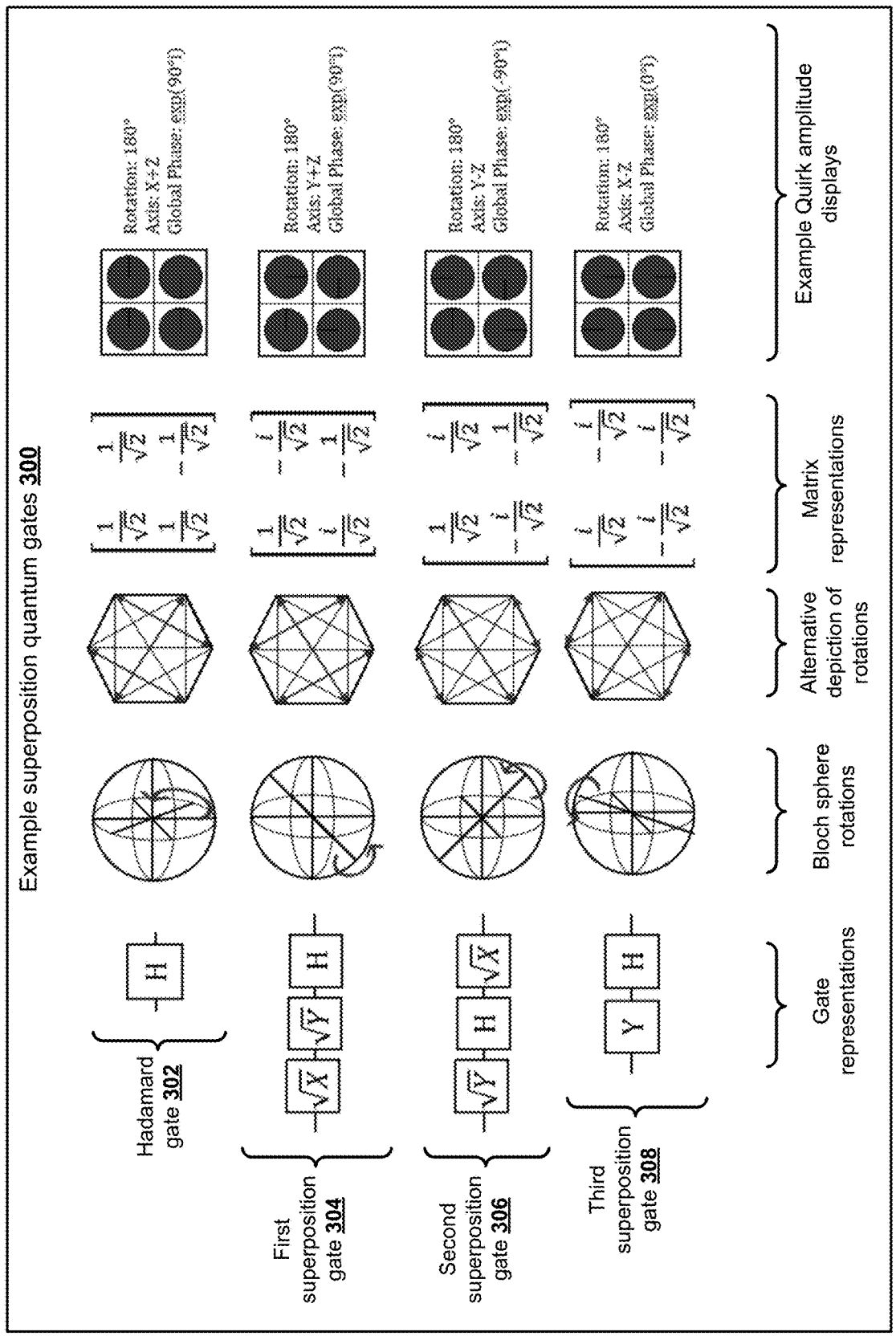
FIG. 3 shows example superposition quantum gates.

FIG. 3 shows example superposition quantum gates. Any of the example superposition gates shown in FIG. 3 can be included in a secret superposition protocol and implemented as part of the secret superposition protocol to transform a qubit from an initial state to a uniform superposition state. For convenience, FIG. 3 shows four example superposition quantum gates—a Hadamard gate 302, a first superposition quantum gate 304, a second superposition quantum gate 306 and a third superposition quantum gate 308. However, other example superposition quantum gates can also be included in a secret superposition protocol, e.g., any single qubit gate that operates on a qubit in a computational basis state and transforms the qubit to a uniform superposition state.

As described above, the Hadamard gate 302 is often used as a default standard to prepare a qubit in a superposition state. The Hadamard gate H is a single qubit gate that implements a 180 degree rotation around the X+Z axis of the Bloch sphere. Application of the Hadamard gate to a qubit initialized in a zero state transforms the state of the qubit to a uniform superposition state:

$$\begin{pmatrix} 1/\sqrt{2} & 1/\sqrt{2} \\ 1\sqrt{2} & -1/\sqrt{2} \end{pmatrix} \begin{pmatrix} 1 \\ 0 \end{pmatrix} = \begin{pmatrix} 1/\sqrt{2} \\ 1/\sqrt{2} \end{pmatrix} = \frac{1}{\sqrt{2}}(|0\rangle + |1\rangle) = |+\rangle.$$

The first superposition quantum gate 304, second superposition quantum gate 306 and third superposition quantum gate 308 are quantum gates that retain an operational functionality of a Hadamard gate 302. For example, each of the first superposition quantum gate 304, second superposition quantum gate 306 and third superposition quantum gate 308 implement 180 degree rotations around a respective diagonal axis of the Bloch sphere and map qubit computational basis states to superposition basis states that have equal measurement probabilities.

The first superposition gate 304 is a single qubit gate that implements a 180 degree rotation around the Y+Z axis of the Bloch sphere. The first superposition gate 304 can be implemented through application of a √X Pauli gate, √Y Pauli gate and a Hadamard gate. The matrix representation of the first superposition gate 304 is given by $$\begin{pmatrix} 1/\sqrt{2} & -i/\sqrt{} \\ i\sqrt{2} & -1/\sqrt{2} \end{pmatrix}.$$

Application of the first superposition gate 304 to a qubit initialized in a zero state transforms the state of the qubit to a uniform superposition state:

$$\begin{pmatrix} 1/\sqrt{2} & -i/\sqrt{2} \\ i\sqrt{2} & -1/\sqrt{2} \end{pmatrix} \begin{pmatrix} 1 \\ 0 \end{pmatrix} = \begin{pmatrix} 1/\sqrt{2} \\ i/\sqrt{2} \end{pmatrix} = \frac{1}{\sqrt{2}}(|0\rangle + i|1\rangle).$$

The second superposition gate 306 is a single qubit gate that implements a 180 degree rotation around the Y-Z axis of the Bloch sphere. The second superposition gate 306 can be implemented through application of a √Y Pauli gate, a Hadamard gate, and a √X Pauli gate. The matrix representation of the second superposition gate 306 is given by $$\begin{pmatrix} 1/\sqrt{2} & i/\sqrt{2} \\ -i\sqrt{2} & -1/\sqrt{2} \end{pmatrix}.$$

Application of the second superposition gate 306 to a qubit initialized in a zero state transforms the state of the qubit to a uniform superposition state:

$$\begin{pmatrix} 1/\sqrt{2} & i/\sqrt{2} \\ -i\sqrt{2} & -1/\sqrt{2} \end{pmatrix} \begin{pmatrix} 1 \\ 0 \end{pmatrix} = \begin{pmatrix} 1/\sqrt{2} \\ -i/\sqrt{2} \end{pmatrix} = \frac{1}{\sqrt{2}}(|0\rangle - i|1\rangle).$$

The third superposition gate 308 is a single qubit gate that implements a 180 degree rotation around the X-Z axis of the Bloch sphere. The third superposition gate 308 can be implemented through application of a Y Pauli gate and a Hadamard gate. The matrix representation of the third superposition gate 308 is given by $$\begin{pmatrix} i/\sqrt{2} & -i/\sqrt{2} \\ -i\sqrt{2} & -i/\sqrt{2} \end{pmatrix}.$$

Application of the third superposition gate 308 to a qubit initialized in a zero state transforms the state of the qubit to a uniform superposition state:

$$\begin{pmatrix} i/\sqrt{2} & -i/\sqrt{2} \\ -i\sqrt{2} & -i/\sqrt{2} \end{pmatrix} \begin{pmatrix} 1 \\ 0 \end{pmatrix} = \begin{pmatrix} i/\sqrt{2} \\ -i/\sqrt{2} \end{pmatrix} = \frac{1}{\sqrt{2}}(i|0\rangle - i|1\rangle).$$

Figure 4A:
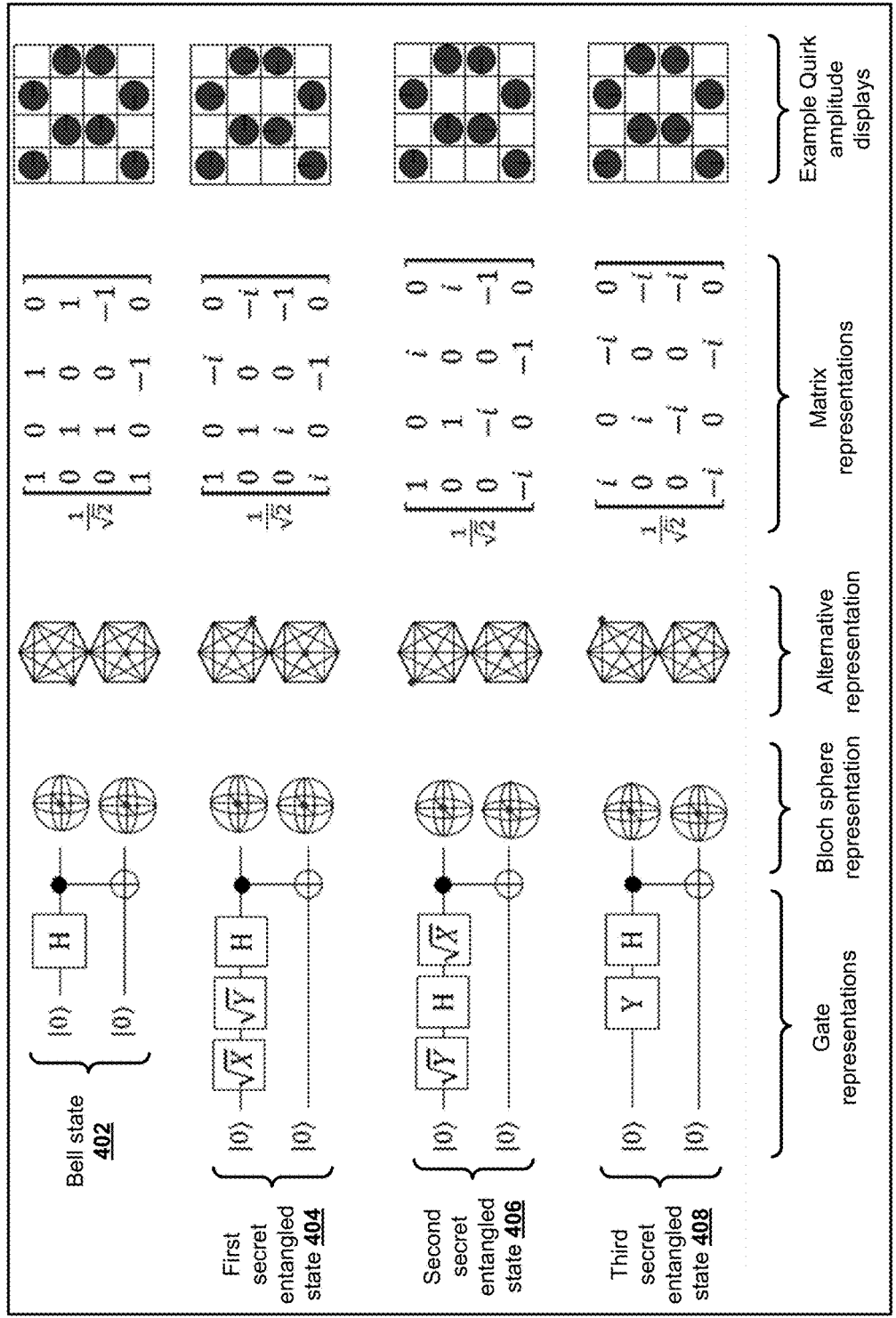
FIGS. 4A and 4B shows example entangled states generated using the superposition quantum gates described with reference to FIG. 3.

FIG. 4A shows example entangled states generated using the superposition quantum gates described above with reference to FIG. 3. Any of the example entangled states shown in FIG. 4A can be included in a secret superposition protocol and implemented as part of the secret superposition protocol to prepare entangled states. For convenience, FIG. 4A shows four example superposition quantum gates, each corresponding to a superposition quantum gate shown in FIG. 3. However, other example entangled states can also be included in a secret superposition protocol, e.g., an entangled state generated through application of a superposition quantum gate that satisfies the properties described above with reference to FIG. 3.

The Hadamard gate can be used to prepare an entangled state called the Bell state 402. Two qubits are each prepared in a zero state. The Hadamard gate H is applied to the first qubit to transform the quantum state of the first qubit to a superposition quantum state, as described above with reference to FIG. 3. A CNOT gate is then applied to the first qubit in the superposition quantum state and the second qubit in the zero state, where the first qubit acts as a control for the CNOT gate. The first qubit and second qubit are then in a Bell state:

$$\frac{1}{\sqrt{2}}\begin{pmatrix}1 & 0 & 1 & 0\\0 & 1 & 0 & 1\\0 & 1 & 0 & -1\\1 & 0 & -1 & 0\end{pmatrix}\begin{pmatrix}1\\0\\0\\0\end{pmatrix}=\frac{1}{\sqrt{2}}\begin{pmatrix}1\\0\\0\\1\end{pmatrix}=\frac{1}{\sqrt{2}}(|00\rangle+|11\rangle).$$

The first secret entangled state 404 is a two-qubit quantum state that can be prepared as follows. Two qubits are each prepared in a zero state. The first superposition gate 304 of FIG. 3 is applied to the first qubit, i.e., a √X Pauli gate, √Y Pauli gate and a Hadamard gate are applied to the first qubit in the zero state. A CNOT gate is then applied to the first qubit in the superposition quantum state and the second qubit in the zero state, where the first qubit acts as a control for the CNOT gate. The first qubit and second qubit are then in an entangled state:

$$\frac{1}{\sqrt{2}}\begin{pmatrix}1 & 0 & -i & 0\\0 & 1 & 0 & -i\\0 & i & 0 & -1\\i & 0 & -1 & 0\end{pmatrix}\begin{pmatrix}1\\0\\0\\0\end{pmatrix}=\frac{1}{\sqrt{2}}\begin{pmatrix}1\\0\\0\\i\end{pmatrix}=\frac{1}{\sqrt{2}}(|00\rangle+i|11\rangle).$$

The second secret entangled state 406 is a two-qubit quantum state that can be prepared as follows. Two qubits are each prepared in a zero state. The second superposition gate 306 of FIG. 3 is applied to the first qubit, i.e., √Y Pauli gate, a Hadamard gate, and a √X Pauli gate are applied to the first qubit in the zero state. A CNOT gate is then applied to the first qubit in the superposition quantum state and the second qubit in the zero state, where the first qubit acts as a control for the CNOT gate. The first qubit and second qubit are then in an entangled state:

$$\frac{1}{\sqrt{2}}\begin{pmatrix}1 & 0 & i & 0\\0 & 1 & 0 & i\\0 & -i & 0 & -1\\-i & 0 & -1 & 0\end{pmatrix}\begin{pmatrix}1\\0\\0\\0\end{pmatrix}=\frac{1}{\sqrt{2}}\begin{pmatrix}1\\0\\0\\-i\end{pmatrix}=\frac{1}{\sqrt{2}}(|00\rangle-i|11\rangle).$$

The third secret entangled state 408 is a two-qubit quantum state that can be prepared as follows. Two qubits are each prepared in a zero state. The third superposition gate 308 of FIG. 3 is applied to the first qubit, i.e., Y Pauli gate and a Hadamard gate are applied to the first qubit in the zero state. A CNOT gate is then applied to the first qubit in the superposition quantum to state and the second qubit in the zero state, where the first qubit acts as a control for the CNOT gate. The first qubit and second qubit are then in an entangled state:

$$\frac{1}{\sqrt{2}}\begin{pmatrix}i & 0 & -i & 0\\0 & i & 0 & -i\\0 & -i & 0 & -i\\-i & 0 & -i & 0\end{pmatrix}\begin{pmatrix}1\\0\\0\\0\end{pmatrix}=\frac{1}{\sqrt{2}}\begin{pmatrix}i\\0\\0\\-i\end{pmatrix}=\frac{1}{\sqrt{2}}(i|00\rangle-i|11\rangle).$$

Figure 4B:
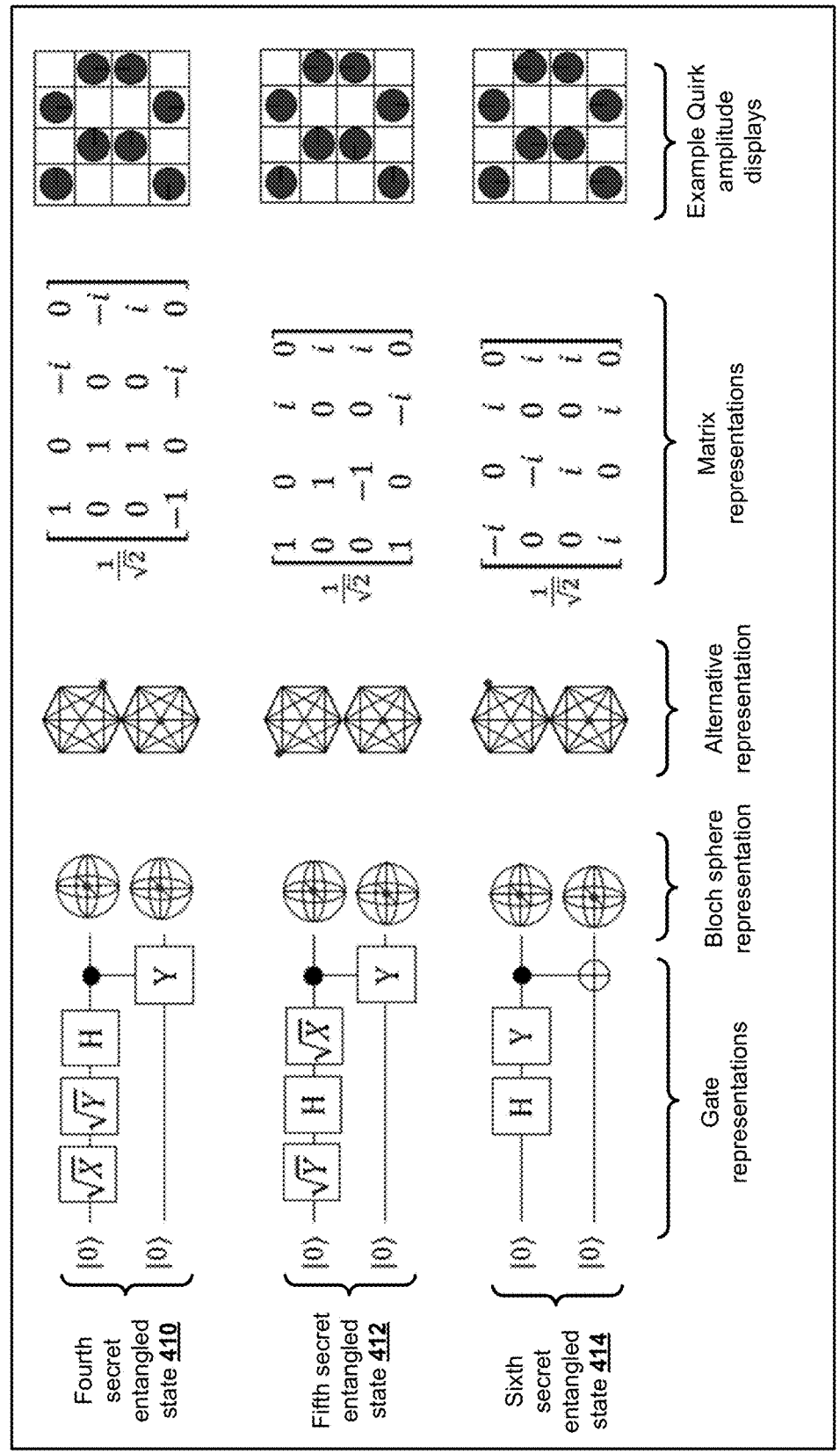

FIG. 4B shows additional example entangled states generated using the superposition quantum gates described above with reference to FIG. 3. As described with reference to FIG. 4A, any of the example entangled states shown in FIG. 4B can be included in a secret superposition protocol and implemented as part of the secret superposition protocol to prepare entangled states. For convenience, FIG. 4B shows three example superposition quantum gates, each corresponding to a superposition quantum gate shown in FIG. 3. However, other example entangled states can also be included in a secret superposition protocol, e.g., an entangled state generated through application of a superposition quantum gate that satisfies the properties described above with reference to FIG. 3.

The fourth secret entangled state 410 is a two-qubit quantum state that can be prepared as follows. Two qubits are each prepared in a zero state. The first superposition gate 304 of FIG. 3 is applied to the first qubit, i.e., a √X Pauli gate, √Y Pauli gate and a Hadamard gate are applied to the first qubit in the zero state. A controlled-Y gate is then applied to the first qubit in the superposition quantum state and the second qubit in the zero state, where the first qubit acts as a control for the controlled-Y gate. The first qubit and second qubit are then in an entangled state:

$$\frac{1}{\sqrt{2}}\begin{pmatrix}1 & 0 & -i & 0\\0 & 1 & 0 & -i\\0 & 1 & 0 & i\\-1 & 0 & -i & 0\end{pmatrix}\begin{pmatrix}1\\0\\0\\0\end{pmatrix}=\frac{1}{\sqrt{2}}\begin{pmatrix}1\\0\\0\\-1\end{pmatrix}=\frac{1}{\sqrt{2}}(|00\rangle-|11\rangle).$$

The difference between the fourth secret entangled state 410 and the first secret entangled state 404 of FIG. 4A is that a controlled-Y gate is used instead of a CNOT gate to generate the fourth entangled quantum state 410.

The fifth secret entangled state 412 is a two-qubit quantum state that can be prepared as to follows. Two qubits are each prepared in a zero state. The second superposition gate 306 of FIG. 3 is applied to the first qubit, i.e., √Y Pauli gate, a Hadamard gate, and a √X Pauli gate are applied to the first qubit in the zero state. A controlled-Y gate is then applied to the first qubit in the superposition quantum state and the second qubit in the zero state, where the first qubit acts as a control for the controlled-Y gate. The first qubit and second qubit are then in an entangled state:

$$\frac{1}{\sqrt{2}}\begin{pmatrix}1 & 0 & i & 0\\0 & 1 & 0 & i\\0 & -1 & 0 & i\\1 & 0 & -i & 0\end{pmatrix}\begin{pmatrix}1\\0\\0\\0\end{pmatrix}=\frac{1}{\sqrt{2}}\begin{pmatrix}1\\0\\0\\1\end{pmatrix}=\frac{1}{\sqrt{2}}(|00\rangle+|11\rangle).$$

The difference between the fifth secret entangled state 412 and the second secret entangled state 406 of FIG. 4A is that a controlled-Y gate is used instead of a CNOT gate to generate the fifth entangled quantum state 412.

The sixth secret entangled state 414 is a two-qubit quantum state that can be prepared as follows. Two qubits are each prepared in a zero state. The third superposition gate 308 of FIG. 3 is applied to the first qubit, i.e., Y Pauli gate and a Hadamard gate are applied to the first qubit in the zero state. A controlled-Y gate is then applied to the first qubit in the superposition quantum state and the second qubit in the zero state, where the first qubit acts as a control for the controlled-Y gate. The first qubit and second qubit are then in an entangled state:

$$\frac{1}{\sqrt{2}}\begin{pmatrix} -i & 0 & i & 0 \\ 0 & -i & 0 & i \\ 0 & i & 0 & i \\ i & 0 & i & 0 \end{pmatrix}\begin{pmatrix} 1 \\ 0 \\ 0 \\ 0 \end{pmatrix} = \frac{1}{\sqrt{2}}\begin{pmatrix} -i \\ 0 \\ 0 \\ i \end{pmatrix} = \frac{1}{\sqrt{2}}(-i|00\rangle + i|11\rangle).$$

The difference between the sixth secret entangled state 414 and the third secret entangled state 408 of FIG. 4A is that a controlled-Y gate is used instead of a CNOT gate to generate the fifth entangled quantum state 412.

Figure 5:
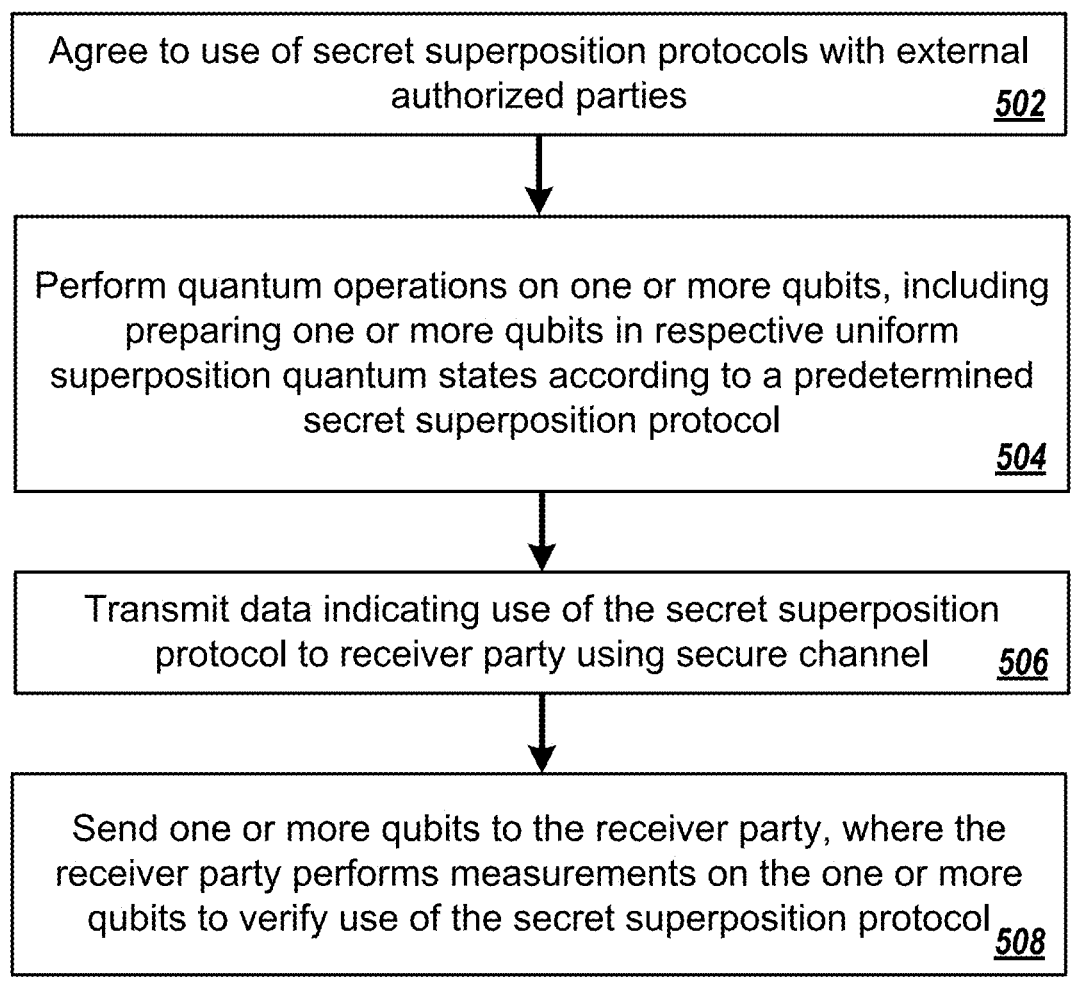
FIG. 5 is a flowchart of an example process for sending qubits to a recipient party.

FIG. 5 is a flowchart of an example process 500 for sending qubits to a recipient party. For convenience, the process 500 will be described as being performed by a sender party system that includes one or more classical and quantum computing devices located in one or more locations. For example, sender party 102 of FIG. 1, appropriately programmed in accordance with this specification, can perform the process 500.

The sender party system communicates with external authorized parties, e.g., the recipient party, and agrees to use one or more secret superposition protocols when communicating with the external authorized parties (step 502). Each secret superposition protocol specifies how and when different secret superposition quantum states are to be prepared and how and when different secret entangled quantum states are to be prepared. For example, a secret superposition protocol can specify that quantum routines requiring preparation of one or more Bell states, e.g., a super dense coding routine or quantum teleportation routine, replaces the preparation of each bell state with preparation of the first, second, third, fourth, fifth or sixth entangled quantum states described above with reference to FIGS. 4A and 4B. As another example, a secret superposition protocol can specify that multiple secret entangled quantum states be prepared, e.g., that a first Bell state be replaced by the first secret entangled quantum state, a second Bell state be replaced by the second secret entangled quantum state, etc. In other words, the secret superposition protocols can specify the use of various combinations of secret superposition quantum gates.

Once the agreement has been confirmed amongst the authorized parties, each party can add the secret superposition quantum gates used by each secret superposition protocol to its quantum computer in a library of logic gate operations.

The system performs quantum operations on one or more qubits (step 504). Performing the quantum operations includes preparing one or more of the qubits in respective uniform superposition quantum states according to a predetermined secret superposition protocol. For example, the system can select one of the secret superposition protocols shared with the recipient party at step 502 and prepare the one or more qubits in respective uniform superposition quantum states according to the selected secret superposition protocol. Other quantum operations performed by the system are dependent on the particular quantum algorithm/routine being performed by the system. Example quantum algorithms and routines are described in more detail below with reference to FIGS. 7-10.

To prepare a qubit in a respective uniform superposition quantum state, the system applies a respective superposition quantum gate (as defined by the selected secret superposition protocol) to the qubit, e.g., where the qubit has been initialized in a zero state The superposition quantum gate is a quantum gate that transforms the state of the qubit through implementation of a 180 degree rotation around a respective diagonal axis of the Bloch sphere. The superposition quantum gate provides an operational functionality that is equal to the operational functionality of the Hadamard gate, e.g., the superposition quantum gate is a single qubit gate that maps qubit computational basis states to a superposition basis state that has equal measurement probabilities. Example secret superposition quantum gates are described above with reference to FIG. 3.

In some implementations performing the quantum operations can further include preparing one or more of the qubits in respective secret entangled quantum states using the prepared uniform superposition quantum states. For example, to generate an entangled quantum state using a uniform superposition quantum state the system can apply a CNOT gate to the uniform superposition quantum state and a qubit prepared in a 0-state, where the uniform superposition quantum state acts as a control for the CNOT gate, or apply a controlled Pauli Y gate to the uniform superposition quantum state and a qubit prepared in a 0-state, where the uniform superposition quantum state acts as a control for the controlled Pauli Y gate. Example secret entangled quantum states are described above with reference to FIGS. 4A and 4B.

The system transmits data indicating which secret superposition protocol was used to perform the quantum operations at step 504 to the recipient party (step 506). The system can transmit the data through a private secure channel, e.g., through an out-of-band (OOB) transmission. The data can include data naming or otherwise indicating which secret superposition protocol was used and must not include data specifying the protocol, e.g., data specifying when and how to use various secret superposition quantum gates.

The system transmits one or more of the qubits to the recipient party (step 508). The number of qubits and specific qubit transmitted by the system is dependent on the quantum algorithm/routine being performed and can vary. Generally, the qubits transmitted to the recipient party can include a qubit that was prepared in a uniform superposition state at step 504 or a qubit that is part of an entangled pair prepared at step 504. The recipient party can perform one or more measurements on the received qubits to verify use of the predetermined secret superposition protocol and therefore detect whether tampering occurred during transmission. Operations performed by the recipient party are described in more detail below with reference to FIG. 6.

Figure 6:
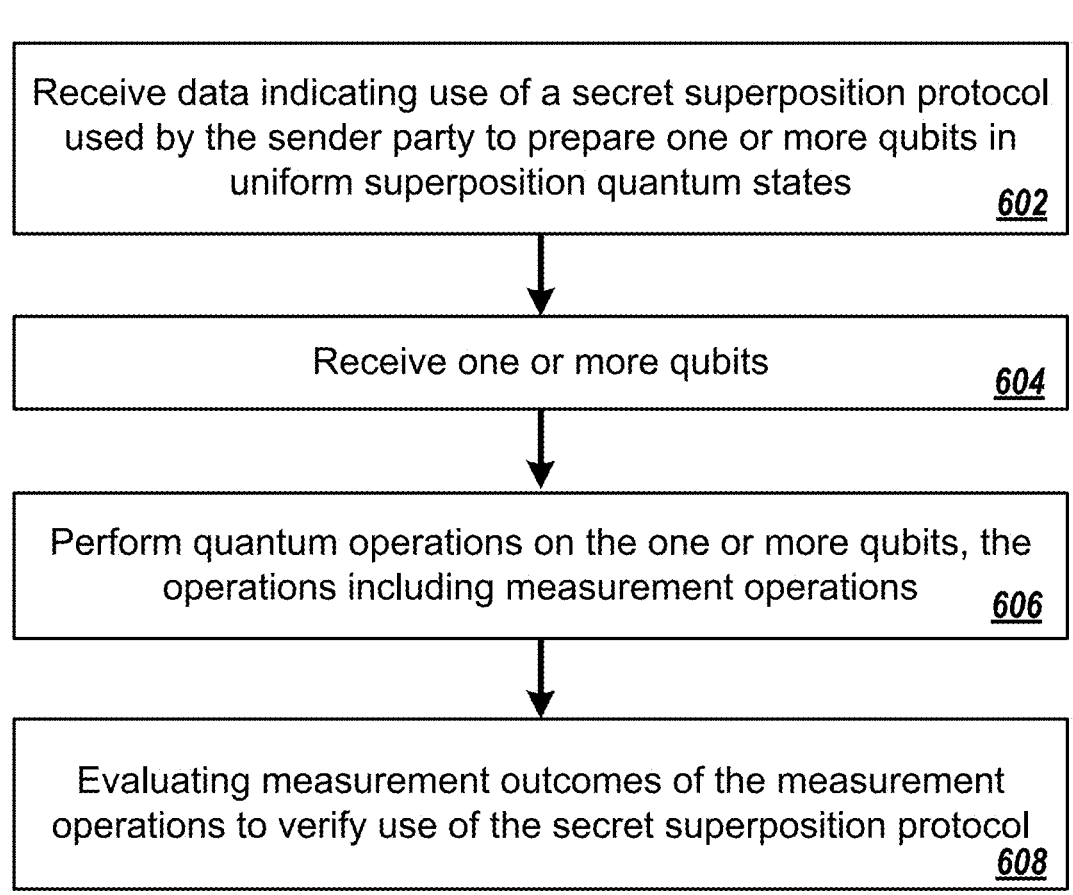
FIG. 6 is a flowchart of an example process for receiving qubits from a sender party.

FIG. 6 is a flowchart of an example process 600 for receiving qubits from a sender party, e.g., receiving qubits from a sender party performing example process 500 of FIG. 5. For convenience, the process 600 will be described as being performed by a recipient party system that includes one or more classical and quantum computing devices located in one or more locations. For example, recipient party 104 of FIG. 1, appropriately programmed in accordance with this specification, can perform the process 600.

The system receives data indicating use of a secret superposition protocol (step 602). The data indicates the secret superposition protocol used by the sender party to prepare one or more qubits in respective uniform superposition quantum states. The system can receive the data from the sender party through a secure channel, e.g., an OOB transmission. Secret superposition protocols and the data indicating use of a secret superposition protocol used by the sender party is described in more detail above with reference to FIG. 5.

The system receives one or more qubits from the sender party (step 604). The number of qubits and type of information encoded in the qubits is dependent on the quantum algorithm/routine being performed by the sender party and recipient party, and can vary. Example quantum algorithms and routines are described in more detail below with reference to FIGS. 7-10.

The system performs quantum operations on the one or more qubits based on the secret superposition protocol, e.g., to extract information from the one or more qubits (step 606). The quantum operations performed by the system depends on the quantum algorithm/routine being performed by the sender party and recipient party. Since the system received data indicating that a secret superposition protocol was used by the sender party to prepare one or more qubits in a secret superposition quantum state, the system can adjust standard quantum operations performed on the one or more qubits based on the secret superposition protocol, e.g., to correctly inverse the gate sequences used by the sender to create superposition states or entangled states.

The quantum operations performed by the system includes measurement operations. The system evaluates measurement outcomes of the measurement operations to verify use of the secret superposition protocol (step 608). In response to successfully verifying use of the secret superposition protocol, the system determines that no tampering or interception occurred. In response to unsuccessfully verifying use of the secret superposition protocol, the system investigates potential tampering or interception. Example measurement outcomes and subsequent verification of a secret superposition protocol are described below with reference to FIGS. 7-10.

The secret superposition protocol itself does not inform the sender, receiver or adversary if it was correctly or incorrectly followed, but mitigates a sophisticated and resourceful adversary. The sender and receiver can gain certainty the protocol was correctly followed by implementing error-detection-codes with the protocol. Example options for implementing an error-detection code with the protocol are described below. These options can be combined or used individually, and each work with the Superdense coding, Teleportation and other examples described in this specification (or generally in settings where the sender knows the state of the qubits post-measurement).

Option 1 (initialization test): the sender (securely) transmits a pre-established initialization-code to the receiver using the quantum secret superposition communication protocol before sending the message qubits, e.g., 101010101010. If the receiver does not receive that exact code during initialization test while using the quantum secret superposition protocol he will know there was a problem and can investigate potential tampering or interception.

Option 2 (periodic health check): the sender can (securely) coordinate with the receiver that they will send health check qubits to the receiver that are interleaved with actual message qubits. For example, every other qubit could be a "health" qubit that should be measured as 0 when the protocol is followed correctly (known as 'Take-1-Skip-1'). An Adversary not knowing the secret entangled bell state will likely cause one of the Zeros to be measured as a 1—which the receiver can detect without knowing the message the sender is sending before-hand.

Option 3 (cyclic redundancy check): The sender securely tells the receiver they will add extra CRC qubits at the end of each message/packet which also use the secret entangled bell state protocol. For example, a parity check qubit at the end will inform the receiver if they should have measured an odd or even number of 1 qubits while using the protocol—which can help determine the protocol was correctly followed.

Option 4 (redundant hamming code): The sender securely tells the receiver they will send each qubit in triplicate while using the protocol. For example, the message 10110 would become 111000111111000. While each 3 qubits is meant to be measured the same—each one of the three will each likely use a different secret entangled bell state and it will not be feasible for an adversary to guess them all—which will cause detectable errors for the receiver.

Figure 7A:
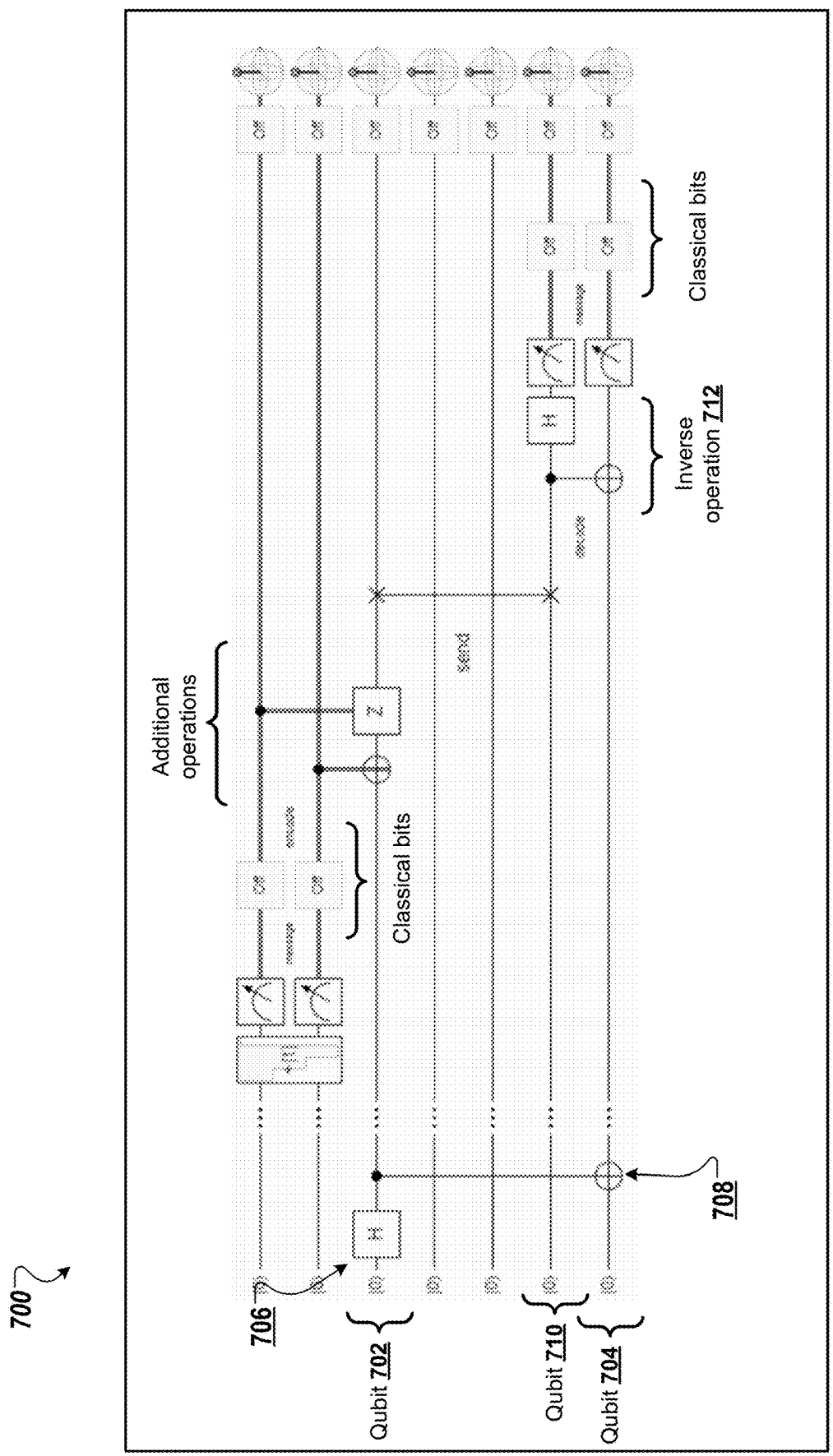
FIG. 7A shows an example circuit diagram for an implementation of superdense coding FIG. 8 quantum teleportation.

FIG. 7A shows an example circuit diagram 700 for an implementation of superdense coding. Superdense coding is a procedure that allows a sender party to send two classical bits to a recipient party using a single qubit of communication. In the example shown in FIG. 7A, the sender party prepares two qubits 702, 704 in an entangled quantum state (a Bell state) using a Hadamard gate 706 and a CNOT operation 708. The sender party then performs additional quantum operations to qubit 702, where the additional operations are based on classical bits of information that the sender party wants to share with the recipient party. The sender party transmits the qubit 702 to the recipient party.

The recipient party receives the qubit 702 and performs quantum operations to obtain the classical bits of information that the sender party encoded in the qubit 702. The quantum operations include a restoration operation—the recipient party uses another qubit 710 to apply an inverse 712 of the quantum operations performed by the sender party to create the entangled quantum state, i.e., a CNOT gate followed by a Hadamard gate. The recipient party then measures the qubits 710 and 704 to obtain the two classical bits of information.

Figure 7B:
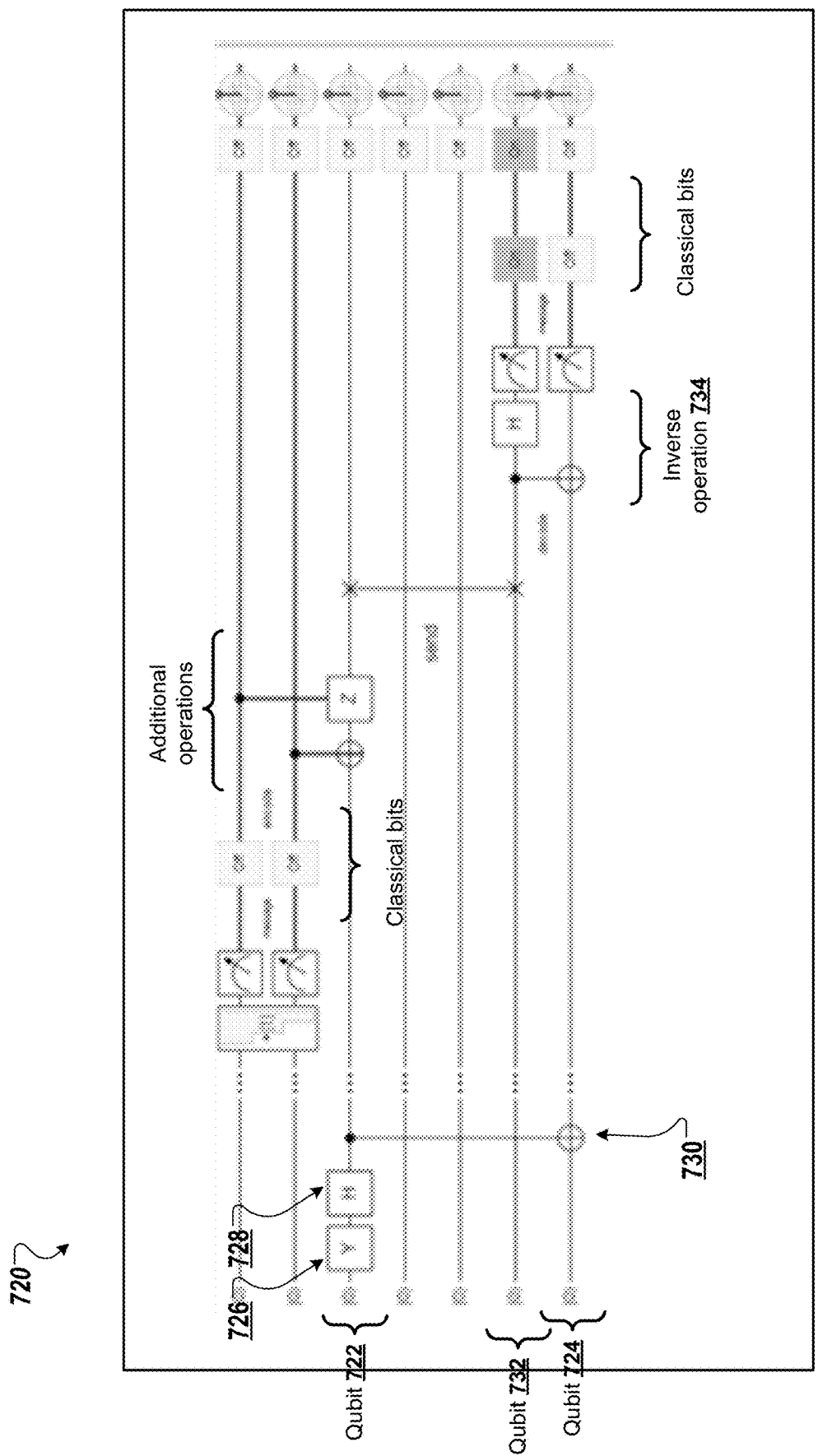
FIG. 7B shows two example circuit diagrams for an implementation of enhanced superdense encoding.
Figure 7B:
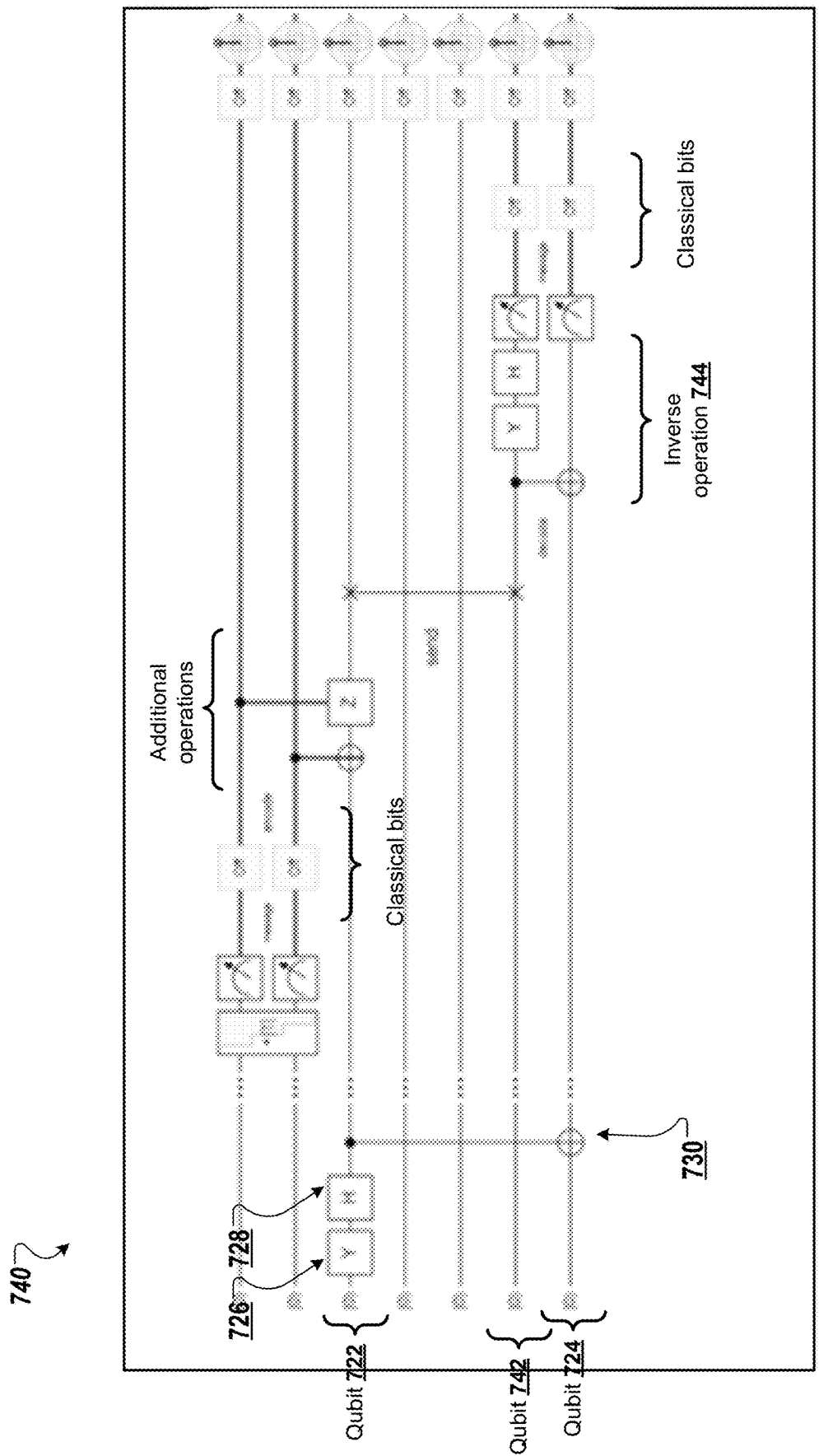

FIG. 7B shows two example circuit diagrams 720, 740 for an implementation of enhanced superdense encoding. In this example, the sender party and recipient party have agreed, in advance, to use a secret superposition protocol in the superdense encoding implementation. In particular, in this example the sender party and recipient party have agreed to use the third superposition quantum gate 308 of FIG. 3 to create superposition quantum states.

In example circuit diagram 720 the sender party prepares two qubits 722, 724 in an entangled quantum state using a Pauli-Y gate 726, Hadamard gate 728 and a CNOT gate 730. The sender party then performs additional quantum operations to qubit 722 in the entangled quantum state, where the additional operations are based on the classical bits of information {0, 0} that the sender party wants to share with the recipient party. The sender party transmits the qubit 722 to the recipient party.

During transmission, an adversary intercepts the transmission of the qubit 722 and performs quantum operations to obtain the classical bits of information that the sender party encoded in the qubit 722. Since the adversary is not included in the authorized parties who agreed, in advance, to use the secret superposition protocol, the adversary does not know that a secret superposition quantum gate was used to prepare the entangled quantum state of the qubits 722, 724. Therefore, the adversary uses another qubit 732 to apply an inverse 734 of quantum operations that would be performed to create a Bell state. The adversary then measures the qubits 732 and 724 to obtain two classical bits of information. Since the adversary incorrectly reversed the entangling operation, the adversary obtains incorrect classical bits {1, 0}.

In example circuit diagram 740 the adversary does not intercept the transmission of the qubit 722. Instead, the recipient party receives the qubit 722 and uses another qubit 742 to apply an inverse 744 of the quantum operations performed by the sender party to create the entangled quantum state, i.e., a CNOT gate, a Pauli Y gate and a Hadamard gate. The recipient party then measures the qubits 742 and 724 to obtain the two classical bits of information. Since the recipient knew that the sender party was implementing the secret superposition protocol they correctly reversed the entangling operation and obtained the correct classical bits {0, 0}.

Figure 7C:
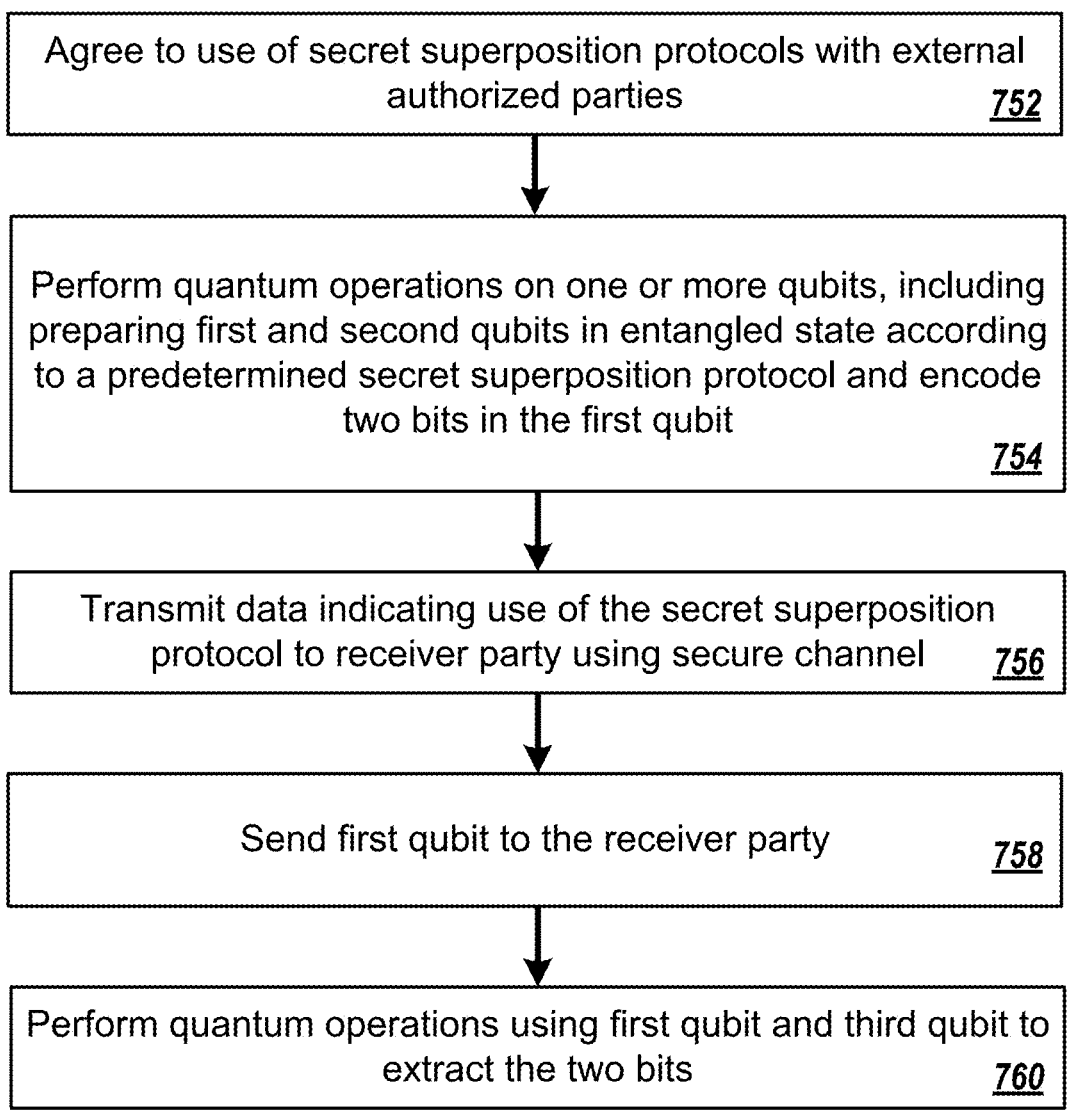
FIG. 7C is a flowchart of an example process for superdense coding.

FIG. 7C is a flowchart of an example process 750 for superdense coding. For convenience, the process 750 will be described as being performed by a sender party system and recipient party system that includes one or more classical and quantum computing devices located in one or more locations. For example, sender party 102 and recipient party 104 of FIG. 1, appropriately programmed in accordance with this specification, can perform the process 750.

The sender party system communicates with external authorized parties, e.g., the recipient party, and agrees to use one or more secret superposition protocols when communicating with the external authorized parties (step 752). Step 752 is similar to step 502 of example process 500, described above with reference to FIG. 5.

The sender party system performs quantum operations on one or more qubits (step 754). The quantum operations include preparing a first qubit and second qubit in an entangled state according to the secret superposition protocol, e.g., using a secret superposition quantum gate. For example, the sender party system can prepare the first qubit in a superposition state using a secret superposition quantum gate and apply a CNOT gate to the first and second qubit, where the first qubit acts as a control. The sender party can then perform operations to encode two bits of information into the first qubit, e.g., perform a classically controlled CNOT gate and classically controlled Pauli Z gate to the first qubit.

The sender party transmits data indicating use of the predetermined secret superposition protocol to the recipient party through a secure channel (step 756). Step 756 is similar to step 506 of example process 500, described above with reference to FIG. 5.

The sender party transmits the first qubit to the recipient party (step 758). Step 758 is similar to step 508 of example process 500, described above with reference to FIG. 5.

The recipient party performs quantum operations using the first qubit and other qubits to extract the classical bits (step 760). The recipient party uses the secret superposition protocol indicated by the received data to perform an inverse operation to reverse the operations performed by the sender party to entangle the first and second qubit using the first qubit and a third qubit. The recipient measures the first and third qubit to obtain the bits of information. Step 760 is similar to steps 604-608 of example process 600, described above with reference to FIG. 6.

Figure 8A:
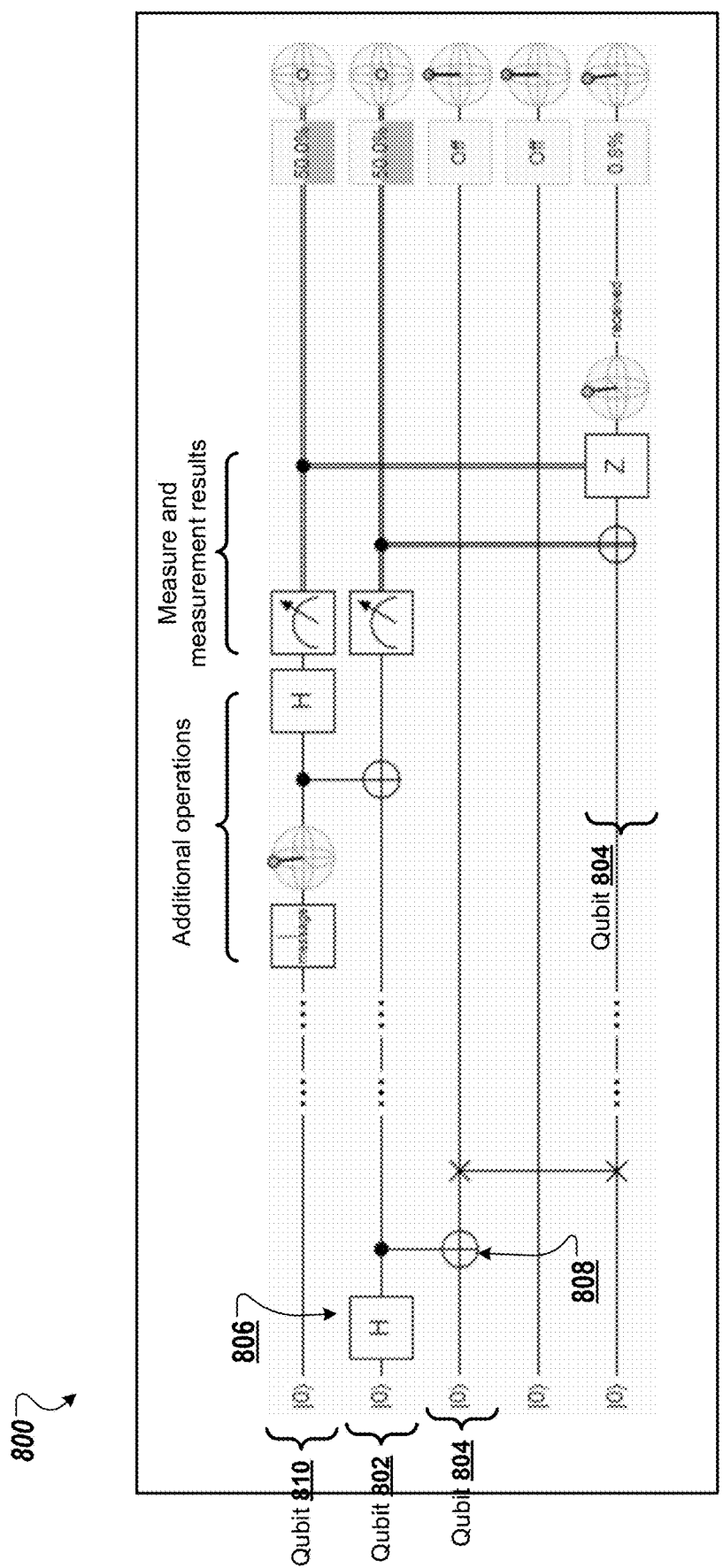
FIG. 8A shows an example circuit diagram for an implementation of quantum teleportation.

FIG. 8A shows an example circuit diagram 800 for an implementation of quantum teleportation. Quantum teleportation is a process by which the state of a qubit can be transmitted from one location to another, using two bits of classical communication and a Bell pair. In other words, it is a protocol that destroys the quantum state of a qubit in one location and recreates it on a qubit at a distant location with the help of shared entanglement. In the example shown in FIG. 8A, the sender party prepares two qubits 802, 804 in an entangled quantum state (a Bell state) using a Hadamard gate 806 and a CNOT operation 808. The sender party then sends the qubit 804 to the recipient party. The sender party also prepares qubit 810 with information and entangles this information down into qubit 802 using additional quantum operations. The sender party measures qubits 802 and 810 and sends the classical measurement results to the recipient party.

The recipient party receives the classical information and returns it to the qubit 804 he received from the sender party through application of a CNOT gate, where one classical bit acts as a control for the CNOT operation, and a Pauli Z gate, where another classical bit acts as a control for the Pauli-Z gate. The information in qubit 810 has then been teleported to the recipient party.

Figure 8B:
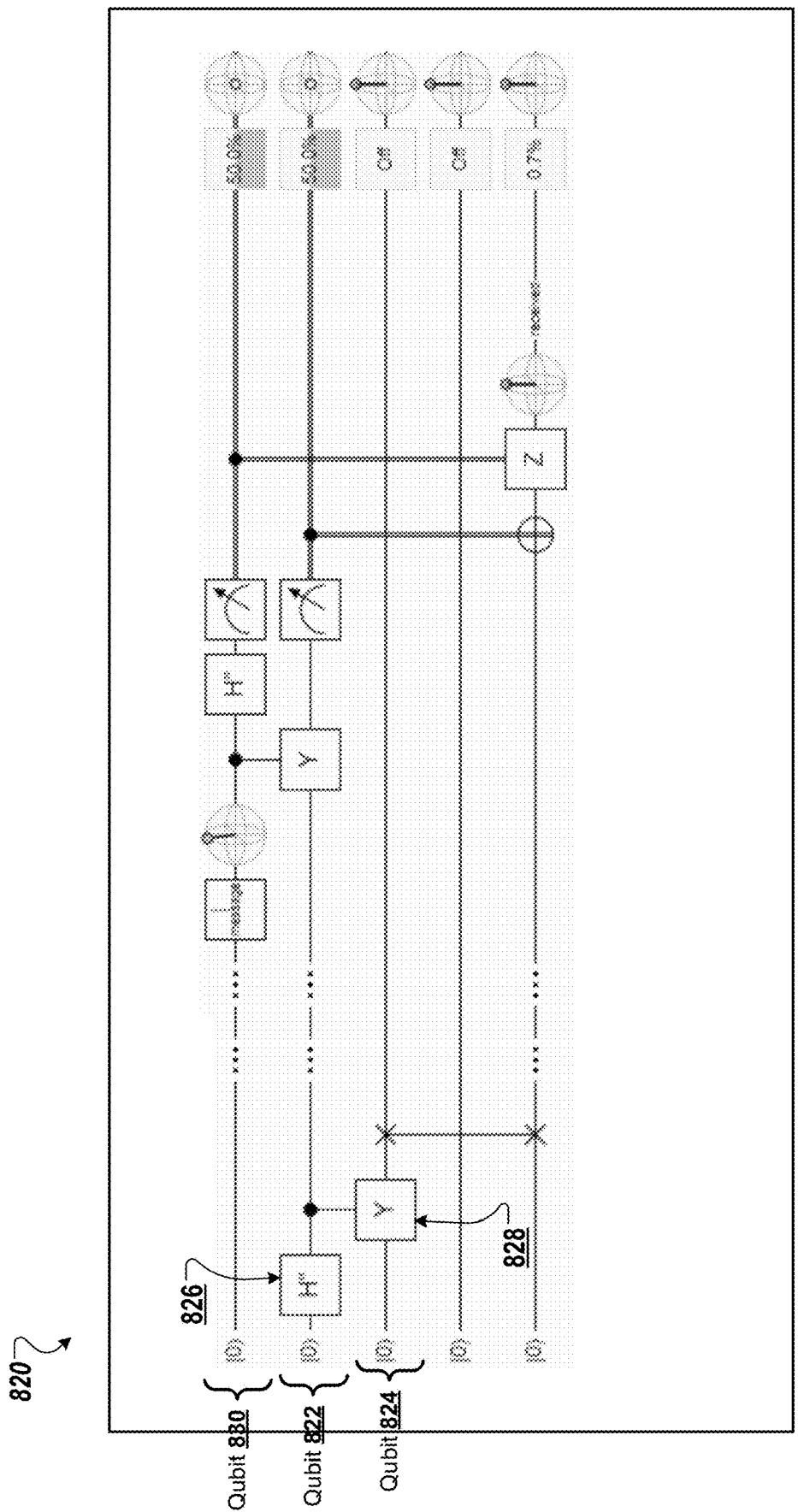
FIG. 8B shows two example circuit diagrams for an implementation of enhanced quantum teleportation.
Figure 8B:
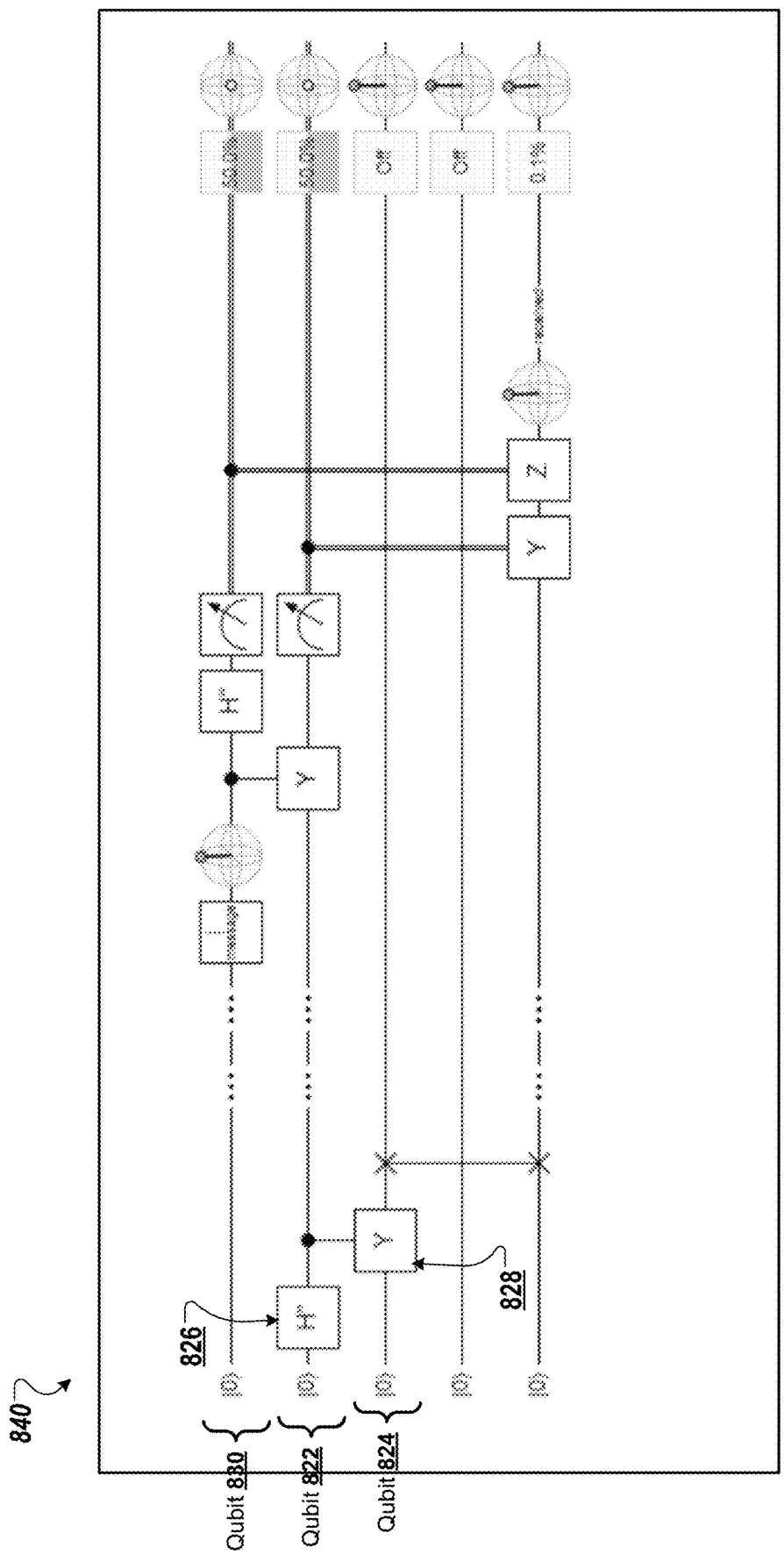

FIG. 8B shows two example circuit diagrams 820, 840 for an implementation of enhanced quantum teleportation. In this example, the sender party and recipient party have agreed, in advance, to use a secret superposition protocol in the superdense encoding implementation. In particular, in this example the sender party and recipient party have agreed to use the second superposition quantum gate 306 of FIG. 3 to create superposition quantum states. In FIG. 8B the second superposition quantum gate 306 is labelled H".

In example circuit diagram 820 the sender party prepares two qubits 822, 824 in an entangled quantum state using the secret superposition gate 826 and a controlled Y operation 828. The sender party then sends the qubit 824 to the recipient party. The sender party also prepares qubit 830 with information and entangles this information down into qubit 822 using additional quantum operations. The sender party measures qubits 822 and 830 and sends the classical measurement results to the recipient party.

During transmission, an adversary intercepts the transmission of the qubit 824 and transmission of the classical information. The adversary attempts to returns it to the qubit 824 through application of a CNOT gate, where one classical bit acts as a control for the CNOT operation, and a Pauli Z gate, where another classical bit acts as a control for the Pauli-Z gate. However, since the adversary does not know the secret superposition protocol was used the adversary incorrectly returns the classical information to the qubit 824. The information in qubit 830 has not been teleported to the adversary.

In example circuit diagram 840, the adversary does not intercept the transmission of the qubit 824 and transmission of the classical information. The recipient party receives the qubit 824 and the classical bits. The recipient party returns the classical bits to the qubit 824 according to the secret superposition protocol and through application of a controlled Y gate and a controlled Z gate, where one classical bit acts as a control for the Y gate and another classical bit acts as a control for the Z gate. Since the recipient party knows the secret superposition protocol the recipient party correctly returns the classical information to the qubit 824. The information in qubit 830 has been teleported to the recipient party.

Figure 8C:
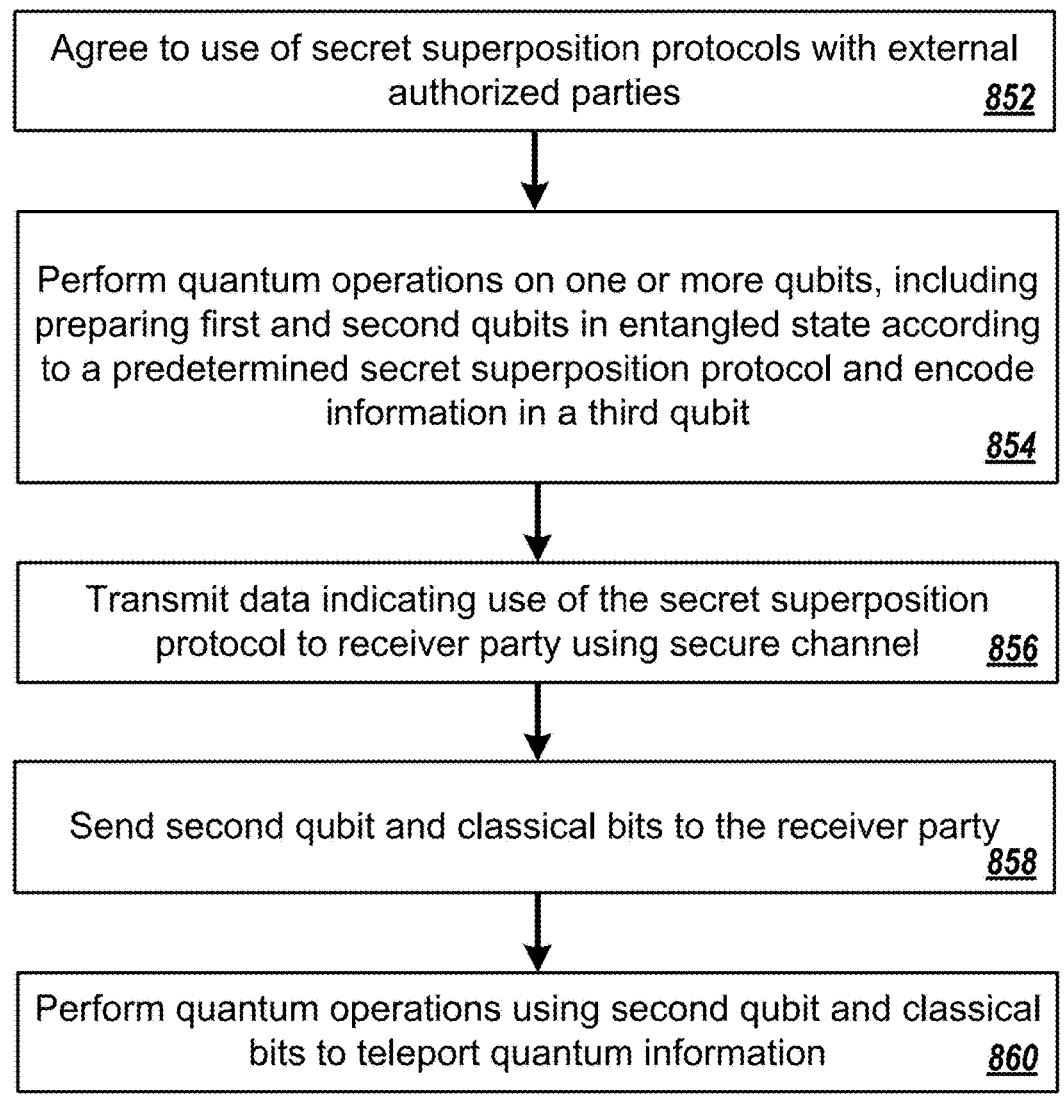
FIG. 8C is a flowchart of an example process for quantum teleportation.

FIG. 8C is a flowchart of an example process 850 for quantum teleportation. For convenience, the process 800 will be described as being performed by a sender party system and recipient party system that includes one or more classical and quantum computing devices located in one or more locations. For example, sender party 102 and recipient party 104 of FIG. 1, appropriately programmed in accordance with this specification, can perform the process 850.

The sender party system communicates with external authorized parties, e.g., the recipient party, and agrees to use one or more secret superposition protocols when communicating with the external authorized parties (step 852). Step 852 is similar to step 502 of example process 500, described above with reference to FIG. 5.

The sender party system performs quantum operations on one or more qubits (step 854). The quantum operations include preparing a first qubit and second qubit in an entangled state according to the secret superposition protocol, e.g., using a secret superposition quantum gate. For example, the sender party system can prepare the first qubit in a superposition state using a secret superposition quantum gate and apply a CNOT gate or controlled Y gate to the first and second qubit, where the first qubit acts as a control. The sender party can then perform operations to encode information into a third qubit and entangles this information down into the first qubit, e.g., by performing a classically controlled Y gate on the first and third qubit, where the third qubit acts as a control, and the superposition quantum gate used to entangle the first and second qubit on the third qubit. The sender party measures the first and third qubit.

The sender party transmits data indicating use of the predetermined secret superposition protocol to the recipient party through a secure channel (step 856). Step 856 is similar to step 506 of example process 500, described above with reference to FIG. 5.

The sender party transmits the second qubit to the recipient party and the classical bits obtained after measuring the first and third qubits (step 858). Step 858 is similar to step 508 of example process 500, described above with reference to FIG. 5.

The recipient party performs quantum operations using the second qubit and classical bits (step 860). The recipient party uses the secret superposition protocol indicated by the received data to return the classical bits to the received second qubit, e.g., performs a controlled Y gate and a controlled Z gate on the second qubit, where the classical bits act as controls for the controlled Y gate and controlled Z gate. The information encoded by the sender party in the third qubit is then teleported to the second qubit.

Figure 9A:
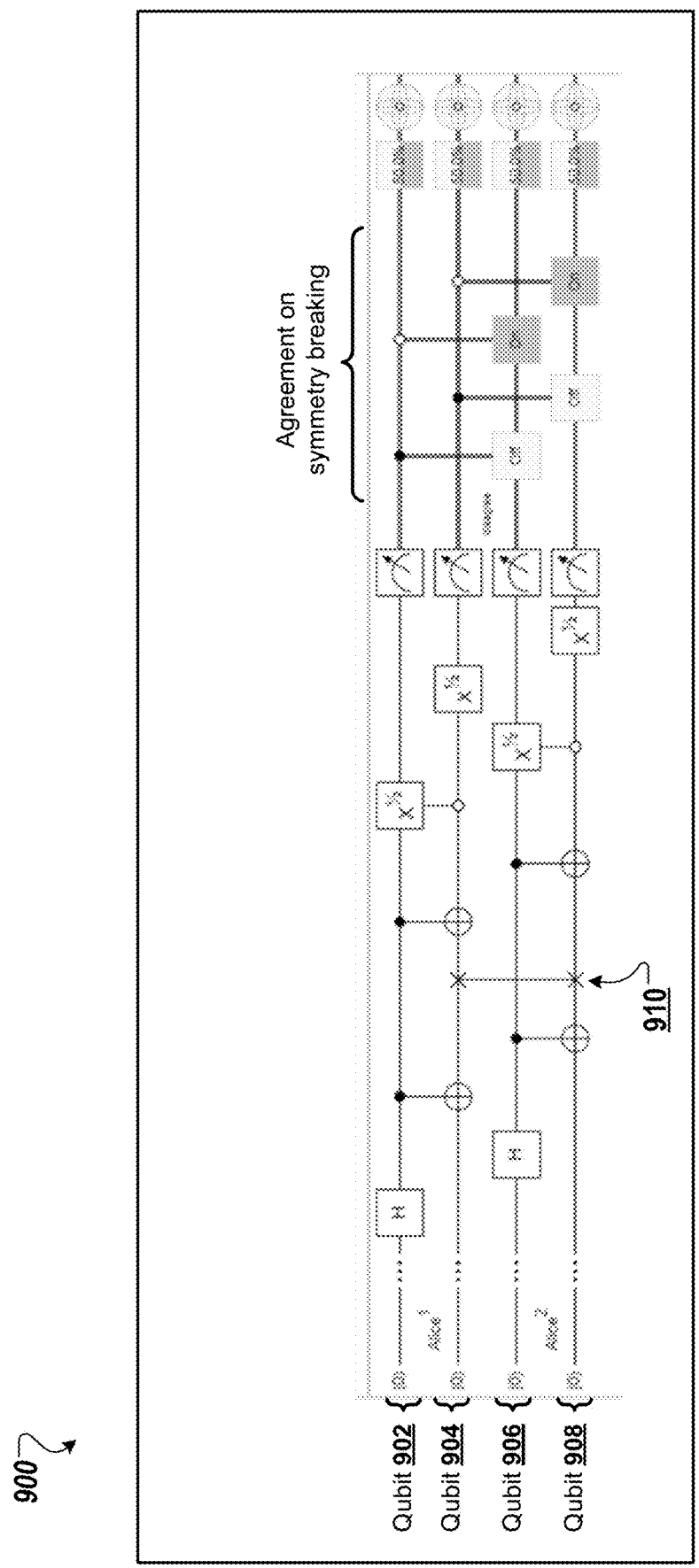
FIG. 9A shows an example circuit diagram for an implementation of quantum symmetry breaking.

FIG. 9A shows an example circuit diagram 900 for an implementation of quantum symmetry breaking. In the example shown in FIG. 9A, a first party prepares two qubits 902, 904 in an entangled quantum state (a Bell state) using a Hadamard gate and a CNOT operation. A second party also prepares two qubits 906, 908 in an entangled quantum state (a Bell state) using a Hadamard gate and a CNOT operation. The first party and second party share one of their qubits with each other, e.g. qubit 904 and qubit 908 are swapped using a swap operation 910. The first party and second party then perform symmetrical phase shifts on their qubits and measure them. For example, the first party can perform a CNOT gate on qubit 908, where qubit 902 acts as a control, a controlled $X^{1/2}$ gate on qubit 902 where qubit 908 acts as a negative controls and a $X^{1/2}$ gate on qubit 908. The second party can perform a CNOT gate on qubit 904, where qubit 906 acts as a control, a controlled $X^{1/2}$ gate on qubit 906 where qubit 904 acts as a negative controls and a $X^{1/2}$ gate on qubit 904. Both parties then measure their qubits and should both agree on who obtain which measurement result, like a distributed fair coin toss.

Figure 9B:
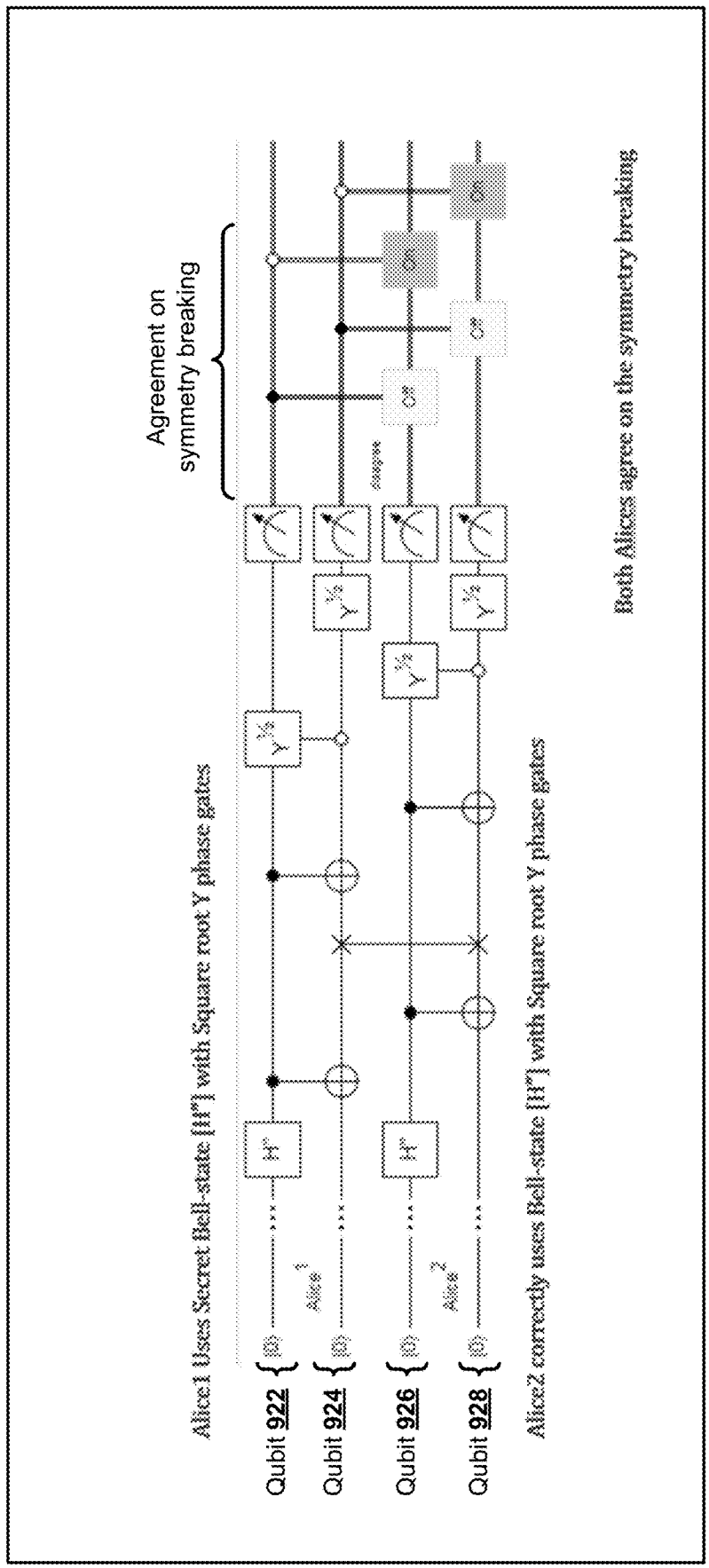
FIG. 9B shows example circuit diagrams for an implementation of enhanced quantum symmetry breaking.
Figure 9B:
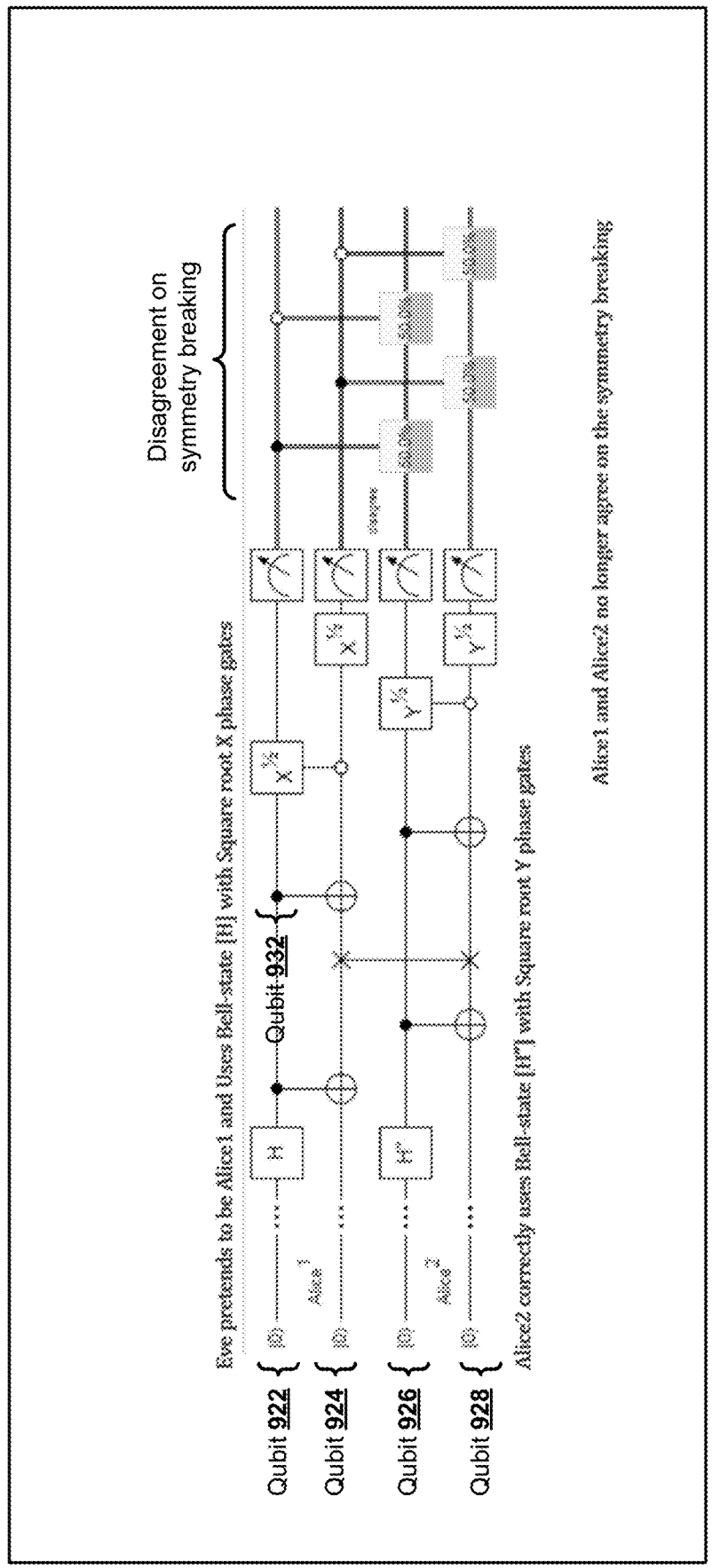

FIG. 9B shows example circuit diagrams 920, 930 for an implementation of enhanced quantum symmetry breaking. In this example, both parties have agreed, in advance, to use a secret superposition protocol in the superdense encoding implementation. In particular, in this example the parties have agreed to use the second superposition quantum gate 306 of FIG. 3 to create superposition quantum states. In FIG. 9B the second superposition quantum gate 306 is labelled H".

In the example circuit 920, the first party prepares two qubits 922, 924 in an entangled quantum state using the second superposition quantum gate H" and a CNOT operation. The second party also prepares two qubits 926, 928 in an entangled quantum state using the second superposition quantum gate H" and a CNOT operation. The first party and second party share one of their qubits with each other, e.g. qubit 924 and qubit 928 are swapped. The first party and second party then perform symmetrical phase shifts on their qubits and measure them. Since both parties have agreed to use the secret superposition protocol, both parties apply the correct phase gates. In particular, the first party performs a CNOT gate on qubit 928, where qubit 922 acts as a control, a controlled $Y^{1/2}$ gate on qubit 922 where qubit 928 acts as a negative controls and a $Y^{1/2}$ gate on qubit 928. The second party performs a CNOT gate on qubit 924, where qubit 926 acts as a control, a controlled $Y^{1/2}$ gate on qubit 926 where qubit 924 acts as a negative controls and a $Y^{1/2}$ gate on qubit 924. Both parties then measure their qubits and agree on the symmetry breaking.

In the example circuit 930, an adversary obtains the second party's qubit 928 when the second party shares qubit 928 with the first party, and uses another qubit 932 to perform symmetrical phase shifts on the qubits 9228 and 932. Since the adversary does not know that both parties had agreed to use the secret superposition protocol, the adversary incorrectly apply the correct phase gates. In particular, the adversary performs operations described above with reference to FIG. 9A. The second party, however, performs the operations described above with reference to example circuit 920. Therefore, the adversary and second party do not agree on the symmetry breaking.

Figure 9C:
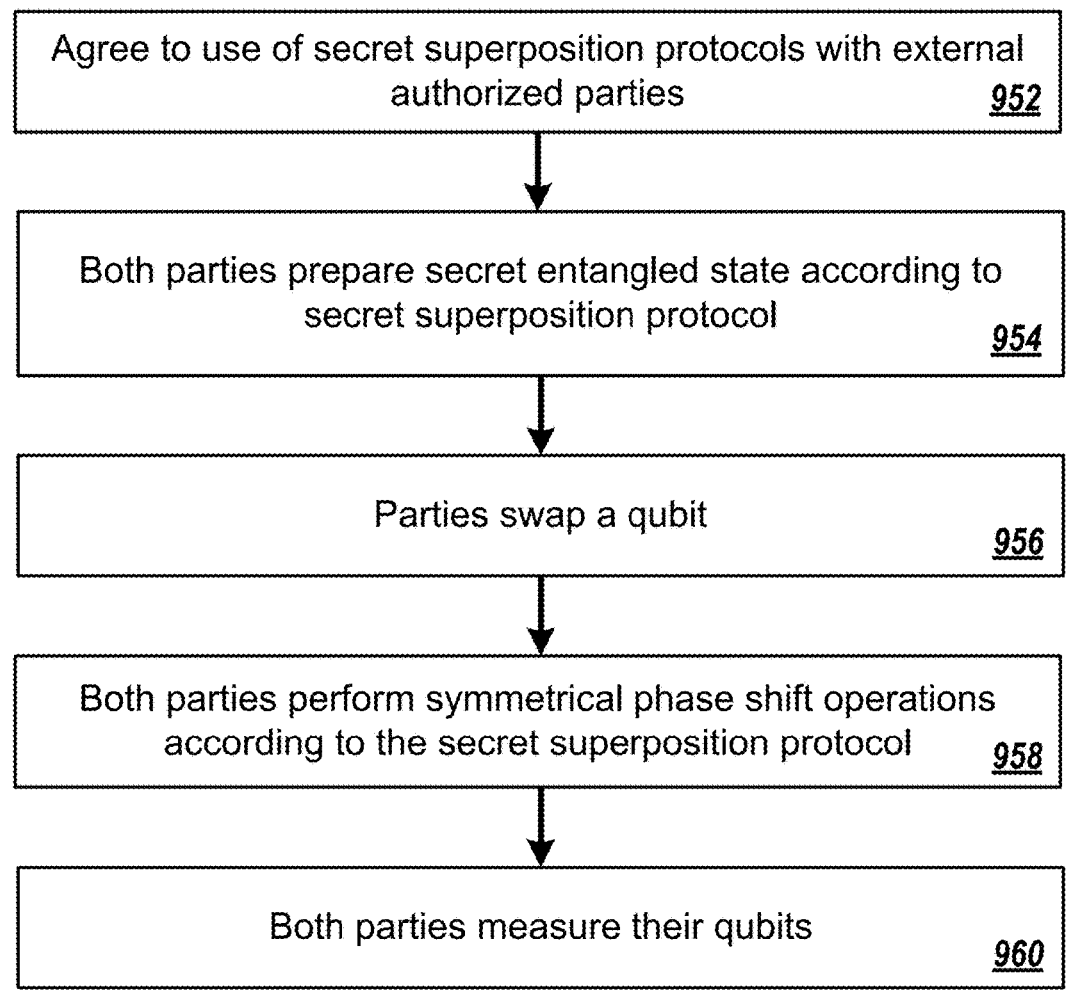
FIG. 9C is a flowchart of an example process for quantum symmetry breaking.

FIG. 9C is a flowchart of an example process 950 for quantum symmetry breaking. For convenience, the process 800 will be described as being performed by a first party system and second party system that include one or more classical and quantum computing devices located in one or more locations. For example, two sender parties 102 of FIG. 1, appropriately programmed in accordance with this specification, can perform the process 950.

The first party communicates with external authorized parties, e.g., the second party, and agrees to use one or more secret superposition protocols when communicating with the external authorized parties (step 952). Step 952 is similar to step 502 of example process 500, described above with reference to FIG. 5.

Each of the first party and second party prepare a secret entangled quantum state according to the secret superposition protocol (step 954). The parties swap one of their qubits with each other (step 956). Each of the first party and second party perform symmetrical phase shift operations on the two qubits they current have according to the secret superposition protocol (step 958). Both parties measure their qubits and determine whether an agreement is reached or not (step 960).

Figure 9D:
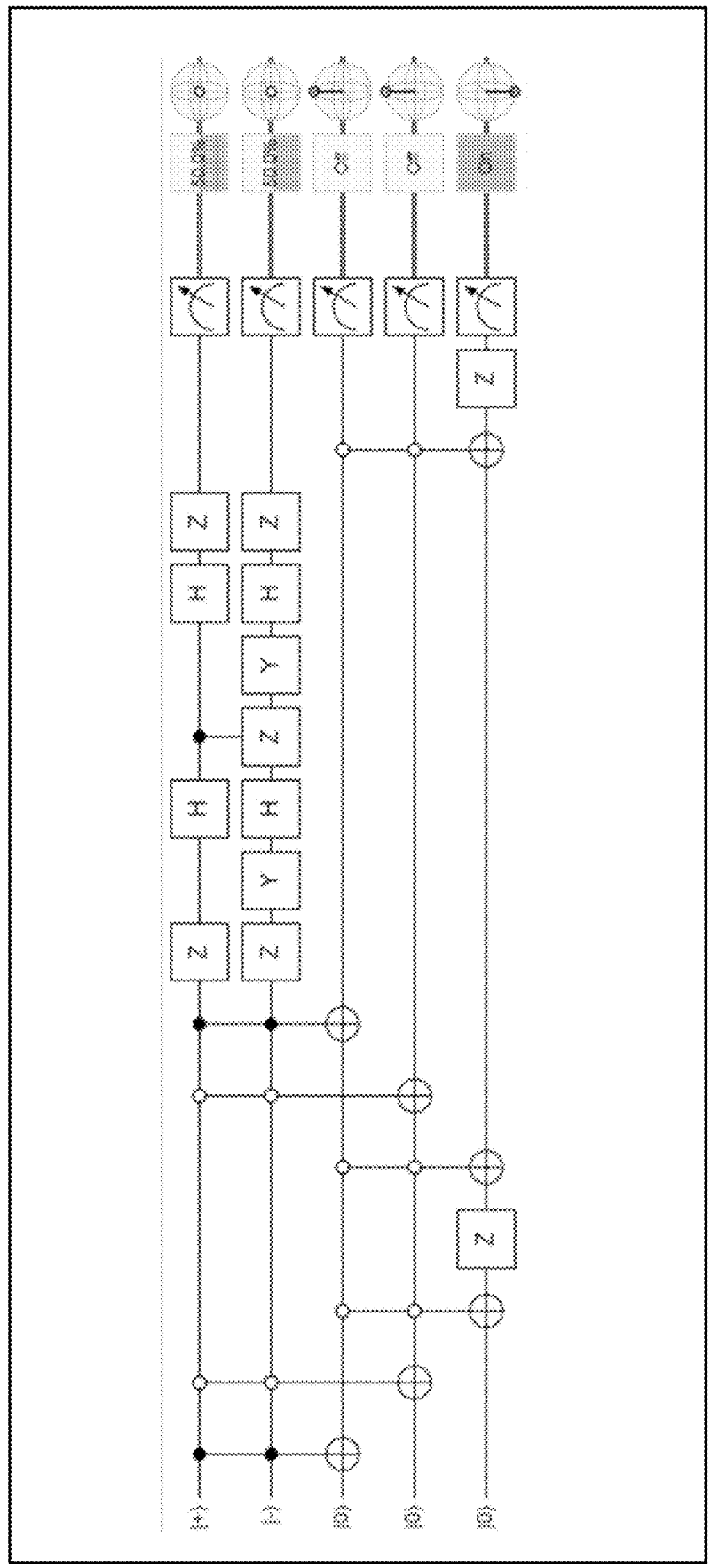
FIG. 9D shows an example circuit diagram for an implementation of enhanced quantum random number generation.

FIG. 9D shows an example circuit diagram 990 for an implementation of enhanced quantum random number generation (RNG). In this example of quantum RNG, a first party prepares a QRNG algorithm but secretly randomizes which starting superposition the random qubits are prepared in. The first party then performs corresponding secret superposition quantum gates to each secret entangled state of the random qubits. If an adversary attempted to manipulate, tamper, or interfere with the algorithm to behave the certain way without knowing the secret entangled state of the QRNG algorithm they will fail and cause the wrong probability outcomes which will cause the fake-random results to be thrown away and an alert triggered.

Figure 10:
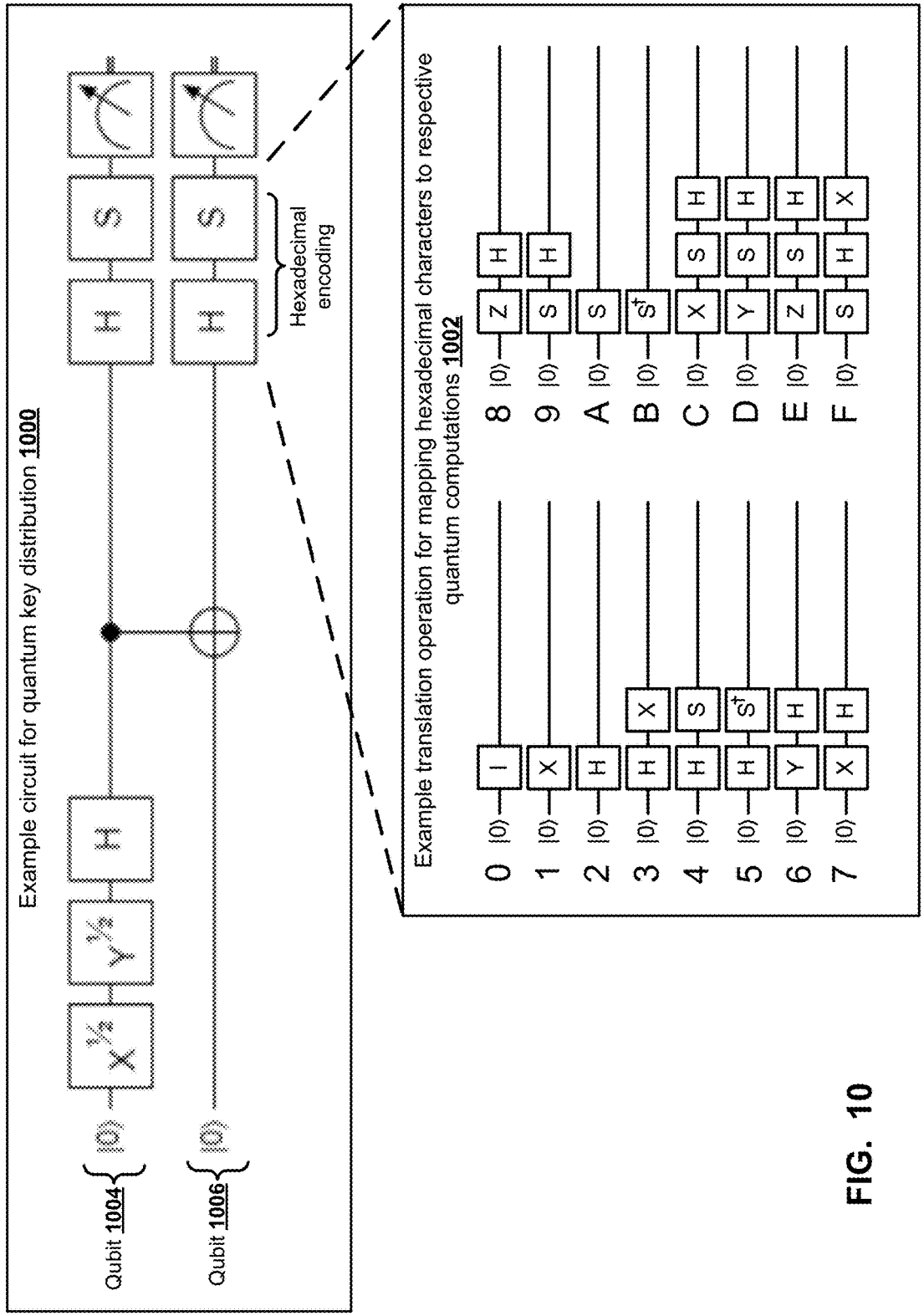
FIG. 10 shows an example quantum circuit for quantum key distribution using an example quantum computation translation that maps hexadecimal characters to respective quantum computations.

FIG. 10 shows an example quantum circuit 1000 for quantum key distribution using an example quantum computation translation 1002 that maps hexadecimal characters to respective quantum computations. The example quantum circuit 1000 operates on two qubits 1004, 1006 where each qubit is prepared in a zero state 10. Unlike conventional methods that entangle qubits in a Bell state, in example quantum circuit 1000 the first secret superposition quantum gate 304 of FIG. 3 is used to create the first secret entangled state 404 of FIG. 4A. Thereafter, a Hadamard gate and an S gate are applied to each qubit 1004 and 1006. Under the example quantum computation translation 1002, application of the Hadamard gate and S gate represents the hexadecimal character "4". Although not shown in example quantum circuit 1000, after the entanglement operation the qubits can be transmitted or swapped with qubits in other locations before quantum computation translation operations are performed.

After the translation operations have been performed, measurement operations can be applied and the outcome of the measurement operations can be transferred to classical hardware. Because a secret entangled state was used to prepare the qubits 1004, 1006, an adversary that eavesdrops or intercepts qubit transmission will not be able to correctly reverse the computation of the qubits and obtain the encoded information.

Figure 11:
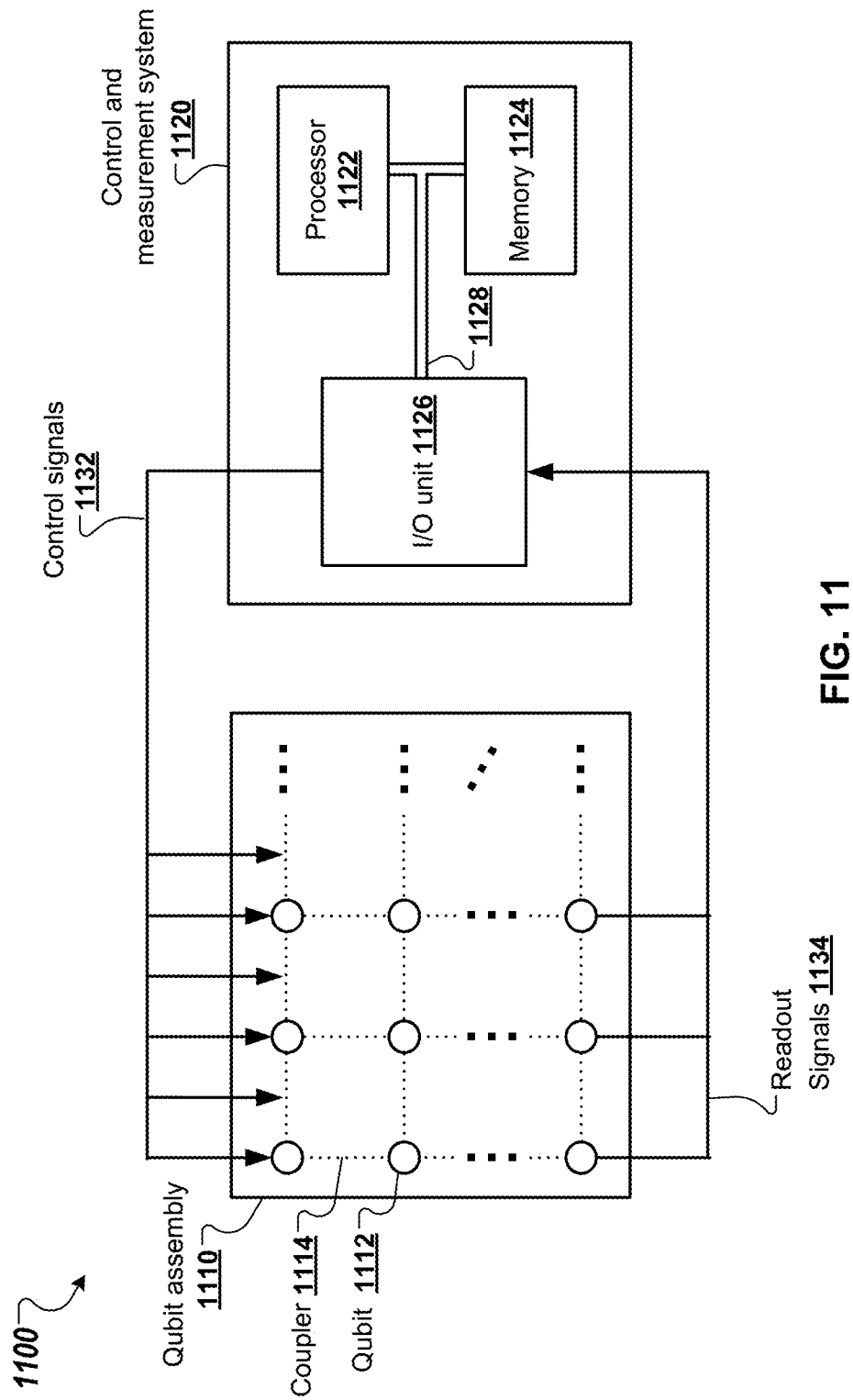
FIG. 11 shows an example an example quantum computing device that may be used to carry out the quantum computing methods described herein.

FIG. 11 is a block diagram of an example quantum computing device 1100. The quantum computing device 1100 can be used to perform the quantum computation operations described in this specification according to some implementations. The quantum computing device 1100 is intended to represent various forms of quantum computing devices. The components shown here, their connections and relationships, and their functions, are exemplary only, and do not limit implementations of the inventions described and/or claimed in this document.

The quantum computing device 1100 includes a qubit assembly 1110 and a control and measurement system 1120. The qubit assembly includes multiple qubits, e.g., qubit 1112, that are used to perform algorithmic operations or quantum computations. While the qubits shown in FIG. 11 are arranged in a rectangular array, this is a schematic depiction and is not intended to be limiting. The qubit assembly 1110 also includes adjustable coupling elements, e.g., coupler 1114, that allow for interactions between coupled qubits. In the schematic depiction of FIG. 11, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 1100 or the type of quantum computations that the quantum computing device 1100 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z (also referred to as X, Y, Z), variations of the Pauli gates, e.g., $\sqrt{X}$, $\sqrt{Z}$, $\sqrt{Y}$ gates, Hadamard and S gates, two-qubit gates, e.g., controlled-X, controlled-Y, controlled-Z (also referred to as CX, CY, CZ), CNOT and gates involving three or more qubits, e.g., Toffoli gates. The quantum logic gates can be implemented by applying control signals 1132 generated by the control and measurement system 1120 to the qubits and to the couplers.

For example, in some implementations the qubits in the qubit assembly 1110 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 1132 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as Z, using respective control signals 1134. The measurements cause readout signals 1134 representing measurement results to be communicated back to the measurement and control system 1120. The readout signals 1134 may include RF, microwave, or optical signals depending on the physical scheme for the quantum computing device 1100 and/or the qubits. For convenience, the control signals 1132 and readout signals 1134 shown in FIG. 11 are depicted as addressing only selected elements of the qubit assembly (i.e. the top and bottom rows), but during operation the control signals 1132 and readout signals 1134 can address each element in the qubit assembly 1110.

The control and measurement system 1120 is an example of a classical computer system that can be used to perform various operations on the qubit assembly 1110, as described above. The control and measurement system 1120 includes one or more classical processors, e.g., classical processor 1122, one or more memories, e.g., memory 1124, and one or more I/O units, e.g., I/O unit 1126, connected by one or more data buses, e.g., bus 1126. The control and measurement system 1120 can be programmed to send sequences of control signals 1132 to the qubit assembly, e.g. to carry out a selected series of quantum gate operations, and to receive sequences of readout signals 1134 from the qubit assembly, e.g. as part of performing measurement operations.

The processor 1122 is configured to process instructions for execution within the control and measurement system 1120. In some implementations, the processor 1122 is a single-threaded processor. In other implementations, the processor 1122 is a multi-threaded processor. The processor 1122 is capable of processing instructions stored in the memory 1124. The memory 1124 stores information within the control and measurement system 1120.

In some implementations, the memory 1124 includes a computer-readable medium, a volatile memory unit, and/or a non-volatile memory unit. In some cases, the memory 1124 can include storage devices capable of providing mass storage for the system 1120, e.g. a hard disk device, an optical disk device, a storage device that is shared over a network by multiple computing devices (e.g., a cloud storage device), and/or some other large capacity storage device.

The input/output device 1126 provides input/output operations for the control and measurement system 1120. The input/output device 1126 can include D/A converters, A/D converters, and RF/microwave/optical signal generators, transmitters, and receivers, whereby to send control signals 1132 to and receive readout signals 1134 from the qubit assembly, as appropriate for the physical scheme for the quantum computer. In some implementations, the input/output device 1126 can also include one or more network interface devices, e.g., an Ethernet card, a serial communication device, e.g., an RS-232 port, and/or a wireless interface device, e.g., an 802.11 card. In some implementations, the input/output device 1126 can include driver devices configured to receive input data and send output data to other external devices, e.g., keyboard, printer and display devices.

Although an example control and measurement system 1120 has been depicted in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 12:
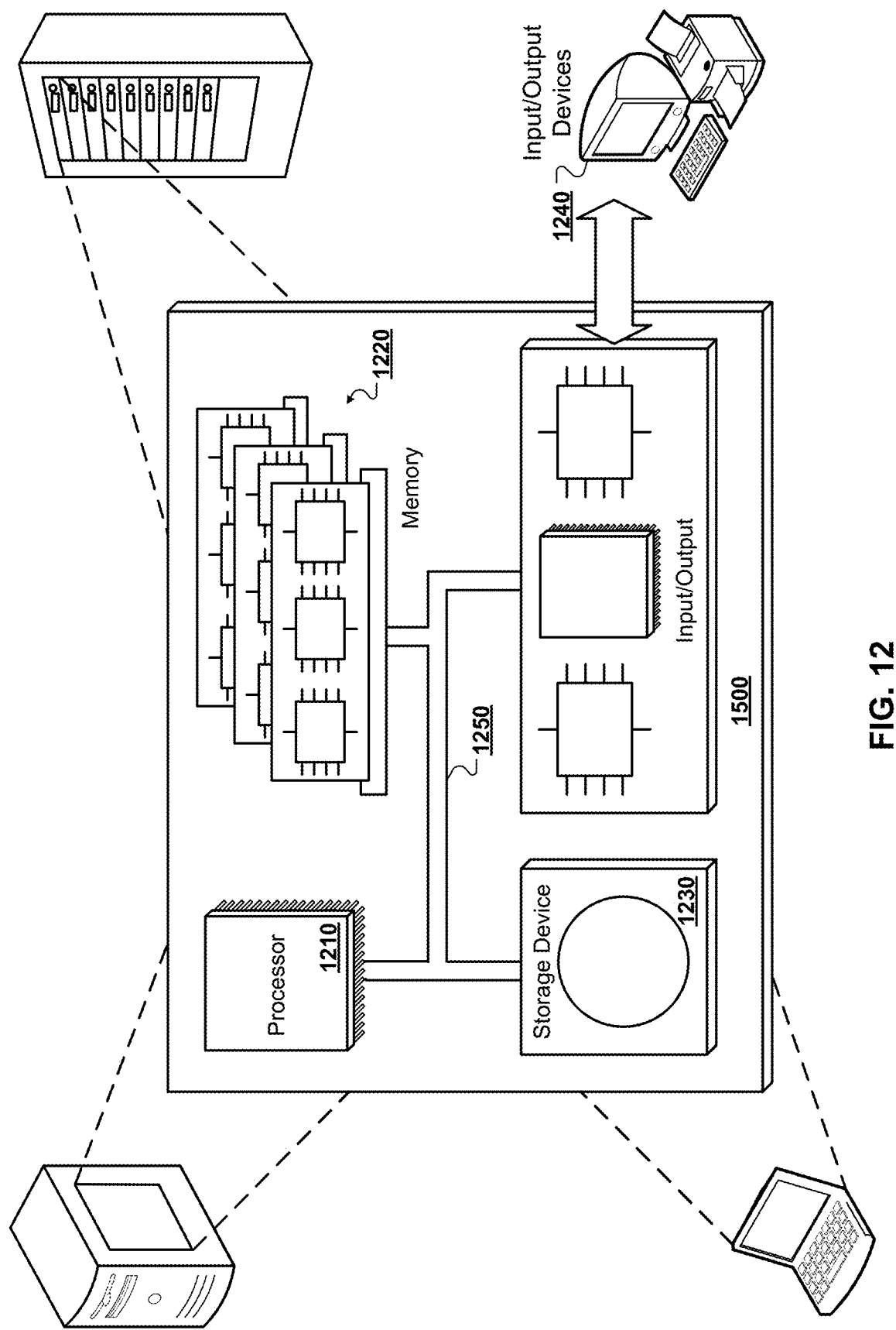
FIG. 12 shows an example classical processor that may be used to carry out the classical computing methods described herein.

FIG. 12 illustrates a schematic diagram of an exemplary generic classical processor system 1200. The system 1200 can be used for the classical operations described in this specification according to some implementations. The system 1200 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 1200 includes a processor 1210, a memory 1220, a storage device 1230, and an input/output device 1240. Each of the components 1210, 1220, 1230, and 1220 are interconnected using a system bus 1250. The processor 1210 may be enabled for processing instructions for execution within the system 1200. In one implementation, the processor 1210 is a single-threaded processor. In another implementation, the processor 1210 is a multi-threaded processor. The processor 1210 may be enabled for processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 may be enabled for providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method comprising
selecting, by a sender party and from among multiple secret superposition protocols that each specify a different preparation of superposition quantum states and secret entangled quantum states, a particular secret superposition protocol that is associated with a particular recipient party;
preparing, by the sender party and using the selected, particular secret superposition protocol, one or more qubits in respective uniform superposition quantum states and in one or more respective entangled quantum states;
transmitting, by the sender party, to the recipient party, and through a secure channel, data indicating use of the selected, particular predetermined secret superposition protocol that is associated with the particular recipient party; and
transmitting, by the sender party and to the particular recipient party, one or more of the qubits that have been prepared using the selected, particular secret superposition protocol that is associated with the particular recipient party, for use by the particular recipient party in verifying privacy of communications over the secure channel.

2. The method of claim 1, wherein preparing one or more qubits in respective uniform superposition quantum states comprises, for each qubit, applying a respective superposition quantum gate to the qubit.

3. The method of claim 2, wherein the superposition quantum gate implements a 180 degree rotation around a respective diagonal axis of the Bloch sphere.

4. The method of claim 2, wherein the superposition quantum gate provides an operational functionality equal to the operational functionality of the Hadamard gate.

5. The method of claim 2, wherein applying a superposition quantum gate to a qubit comprises applying a superposition quantum gate to a qubit initialized in an 0-state.

6. The method of claim 2, wherein a first superposition quantum gate implements a 180 degree rotation around the Y+Z axis of the Bloch sphere.

7. The method of claim 5, wherein applying the first superposition quantum gate to the qubit comprises applying a $\sqrt{X}$ Pauli gate, $\sqrt{Y}$ Pauli gate and a Hadamard gate to the qubit.

8. The method of claim 2, wherein a second superposition quantum gate implements a 180 degree rotation around the Y-Z axis of the Bloch sphere.

9. The method of claim 7, wherein applying the second superposition quantum gate to the qubit comprises applying a $\sqrt{Y}$ Pauli gate, a Hadamard gate, and a $\sqrt{X}$ Pauli gate to the qubit.

10. The method of claim 2, wherein a third superposition quantum gate implements a 180 degree rotation around the X-Z axis of the Bloch sphere.

11. The method of claim 9, wherein applying the third superposition quantum gate to the qubit comprises applying a Y Pauli gate and a Hadamard gate to the qubit.

12. The method of claim 2, wherein the superposition quantum gate comprises a Hadamard gate.

13. The method of claim 1, comprising generating the one or more entangled quantum states using the uniform superposition quantum states.

14. The method of claim 1, comprising performing a quantum symmetry breaking algorithm, quantum super dense coding, quantum teleportation, or a quantum distributed key algorithm.

15. The method of claim 1, wherein the sender party and the particular recipient party comprise parties authorized to perform quantum gate operations under one or more secret superposition protocols that are shared between both parties.

16. The method of claim 15, further comprising adding superposition quantum gates corresponding to each secret superposition protocol to libraries of logic gate operations included in quantum computers used by the authorized parties.

17. A system comprising:
one or more classical processors; and
quantum computing hardware;
wherein the system is configured to perform operations comprising:
selecting, by a sender party and from among multiple secret superposition protocols that each specify a different preparation of superposition quantum states and secret entangled quantum states, a particular secret superposition protocol that is associated with a particular recipient party;
preparing, by the sender party and using the selected, particular secret superposition protocol, one or more qubits in respective uniform superposition quantum states and in one or more respective entangled quantum states;
transmitting, by the sender party, to the recipient party, and through a secure channel, data indicating use of the selected, particular predetermined secret superposition protocol that is associated with the particular recipient party; and
transmitting, by the sender party and to the particular recipient party, one or more of the qubits that have been prepared using the selected, particular secret superposition protocol that is associated with the particular recipient party, for use by the particular recipient party in verifying privacy of communications over the secure channel.

\* \* \* \* \*

UNITED STATES PATENT AND TRADEMARK OFFICE
CERTIFICATE OF CORRECTION

| | | |
|---|---|---|
| PATENT NO. | : 11,924,174 B2 | Page 1 of 1 |
| APPLICATION NO. | : 17/952179 | |
| DATED | : March 5, 2024 | |
| INVENTOR(S) | : Benjamin Glen McCarty and Malek Ben Salem | |

It is certified that error appears in the above-identified patent and that said Letters Patent is hereby corrected as shown below:

On the Title Page

Under item "(57) Abstract", Line 12, delete "to".

Signed and Sealed this
Twenty-second Day of April, 2025

Coke Morgan Stewart
*Acting Director of the United States Patent and Trademark Office*